United States Patent
Carter et al.

(10) Patent No.: US 10,025,331 B2
(45) Date of Patent: Jul. 17, 2018

(54) PREDICTIVE TEMPERATURE MANAGEMENT SYSTEM CONTROLLER

(71) Applicant: PassivSystems Limited, Newbury (GB)

(72) Inventors: Edwin Carter, Berkshire (GB); Peter Roberts, Berkshire (GB)

(73) Assignee: PassivSystems Limited, Newbury (GB)

( * ) Notice: Subject to any disclaimer, the term of this patent is extended or adjusted under 35 U.S.C. 154(b) by 758 days.

(21) Appl. No.: 14/400,959

(22) PCT Filed: Feb. 18, 2013

(86) PCT No.: PCT/GB2013/050376
§ 371 (c)(1),
(2) Date: Nov. 13, 2014

(87) PCT Pub. No.: WO2013/171448
PCT Pub. Date: Nov. 21, 2013

(65) Prior Publication Data
US 2015/0134124 A1    May 14, 2015

(30) Foreign Application Priority Data

May 15, 2012   (GB) .................................. 1208519.7

(51) Int. Cl.
*G05B 15/00*   (2006.01)
*G05D 23/19*   (2006.01)
(Continued)

(52) U.S. Cl.
CPC .......... *G05D 23/1923* (2013.01); *F24F 11/30* (2018.01); *F24F 11/62* (2018.01);
(Continued)

(58) Field of Classification Search
CPC . G06F 3/04847; G06F 17/509; G05B 13/024; G05B 13/048; B60N 2/5678;
(Continued)

(56) References Cited

U.S. PATENT DOCUMENTS 5,467,265 A    11/1995   Yamada et al.
5,700,993 A    12/1997   Counsell et al.
(Continued)

FOREIGN PATENT DOCUMENTS

EP    0688085 A1    12/1995
GB    2423898 A  *  9/2006    ............. H04L 25/02
WO    WO 2011/100736 A2    8/2011

OTHER PUBLICATIONS

Karmarkar, Narendra, "A New Polynomial Time Algorithm for Linear Programming," *Combinatorica*, vol. 4, No. 4, pp. 373-395, 1984.
(Continued)

*Primary Examiner* — Tuan Vu
(74) *Attorney, Agent, or Firm* — Dascenzo Intellectual Property Law, P.C.

(57) ABSTRACT

A controller for a temperature management system for heating and/or cooling a room in accordance with a schedule of set point temperatures over a control period as a data processor arrangement (10). A signal indicative of the current temperature of the room is received at a temperature input (9) for receiving a signal indicative of the current temperature in the room and a control output (18) for supplying control signals to the system. The controller has at least one electronic memory for storing said schedule of set point temperatures, a relationship, based on known heating or cooling characteristics of the room, between the energy supplied to the system in a portion of the control period and the predicted temperature of the room during that portion and subsequent portions of the control period. The electronic memory also stores a first parameter value representative of the cost of supplying said energy and a second parameter value representative of a predetermined acceptability of variations of the actual or predicted temperature of the room from the set point schedule, wherein the processor arrange-
(Continued)

ment (10) is operable to calculate, for each said portion, the energy to be supplied to the system in order for a plurality of parameter values to satisfy a predetermined criterion, said plurality of parameter values comprising said first parameter value and said second parameter value.

27 Claims, 6 Drawing Sheets

(51) Int. Cl.
| | |
|---|---|
| *G05B 15/02* | (2006.01) |
| *G06N 5/04* | (2006.01) |
| *F24F 11/30* | (2018.01) |
| *F24F 11/62* | (2018.01) |
| *F24F 110/10* | (2018.01) |
| *F24F 130/00* | (2018.01) |
| *F24F 130/10* | (2018.01) |
| *F24F 11/64* | (2018.01) |
| *F24F 11/46* | (2018.01) |
| *F24F 11/47* | (2018.01) |

(52) U.S. Cl.
CPC ............... *G05B 15/02* (2013.01); *G06N 5/04* (2013.01); *F24F 11/46* (2018.01); *F24F 11/47* (2018.01); *F24F 11/64* (2018.01); *F24F 2110/10* (2018.01); *F24F 2130/00* (2018.01); *F24F 2130/10* (2018.01)

(58) Field of Classification Search
CPC . B60K 6/48; A01K 1/033; H04L 27/26; F24F 2130/00; F24F 11/46; G05D 23/1923; G05D 23/1917
See application file for complete search history.

(56) References Cited

U.S. PATENT DOCUMENTS

| | | | |
|---|---|---|---|
| 5,926,776 | A | 7/1999 | Glorioso et al. |
| 2004/0143428 | A1* | 7/2004 | Rappaport ............ G06F 17/509 703/22 |
| 2007/0278209 | A1* | 12/2007 | Fernandez ........... B60N 2/5678 219/497 |
| 2008/0122228 | A1* | 5/2008 | Liu .......................... B60K 6/48 290/40 C |
| 2009/0001181 | A1 | 1/2009 | Siddaramanna et al. |
| 2009/0001182 | A1 | 1/2009 | Siddaramanna et al. |
| 2009/0005889 | A1* | 1/2009 | Sayyar-Rodsari ... G05B 13/048 700/44 |
| 2009/0112369 | A1 | 4/2009 | Gwerder et al. |
| 2010/0228583 | A1* | 9/2010 | Banfield ............. G06F 3/04847 705/7.38 |
| 2011/0106327 | A1* | 5/2011 | Zhou .................... G05B 13/024 700/291 |
| 2011/0264290 | A1 | 10/2011 | Drew |
| 2012/0199080 | A1* | 8/2012 | Siddons ................. A01K 1/033 119/448 |
| 2013/0304266 | A1* | 11/2013 | Giannakis ............ G01R 21/133 700/286 |
| 2014/0332195 | A1* | 11/2014 | Liberman .......... G05D 23/1917 165/267 |

OTHER PUBLICATIONS

Hämäläinen, Raimo P., et al., "Dynamic multi-objective heating optimization," European Journal of Operational Research, vol. 142, No. 1, pp. 1-15, Oct. 1, 2002.

Wright, Margaret H., "The interior-point revolution in optimization: history, recent developments, and lasting consequences," Bull. Amer. Math. Soc. (N.S), vol. 42., pp. 39-56, http://citeseerx.ist.psu.edu/viewdoc/summary?doi=10.1.1.97.8349, 2005.

Huval, B., Barooah, P., "Optimization of a Heating System Using Smart Meters & Dynamic Pricing," University of Florida Undergraduate Honors Thesis, pp. 1-5, Aug. 31, 2010, retrieved from the Internet: URL: http://brodyhuval.com/wp-content/uploads/2012/11/HuvalBrodyHonorsThesis1.pdf.

Search Report issued in connection with United Kingdom Patent Application No. GB 1208519.7, 2 pages, United Kingdom Intellectual Property Office, dated Sep. 13, 2012.

International Search Report issued in connection with PCT Patent Application No. PCT/GB2013/050376, European Patent Office, dated May 14, 2013.

\* cited by examiner

PREDICTIVE TEMPERATURE MANAGEMENT SYSTEM CONTROLLER

FIELD OF THE INVENTION

This invention relates to a controller for a temperature management system, and to a method of controlling such a system.

BACKGROUND TO THE INVENTION

The invention is particularly applicable to temperature management systems, such as heating and/or air conditioning systems, that are used to control the temperature of one or more rooms in a building or other structure. The invention is more particularly, but not exclusively, concerned with domestic space heating systems and their control.

Most domestic space heating systems control the temperature by targeting a set point temperature (which may form part of a schedule of set point temperatures that vary over a control period) and using a thermostat with hysteresis to turn the heat source on and off. This level of control is based only on the current state of the house and its heating system, and does not take into account any forward planning or knowledge of the thermal response of the house. Consequently, this known method of control can fail to achieve energy efficiency and/or the best comfort for the occupants of the house. For example, the room temperature is prone to fluctuate significantly under thermostatic control and can be uncomfortably low for the first part of a period with a raised set point temperature. Furthermore, if the set point temperature is raised for a relatively short period of time, this could result in further energy wastage as the temperature of the room increases gradually over that period, only reaching the vicinity of the set point temperature towards, or after, the end of the period of the raised set point temperature.

SUMMARY OF THE INVENTION

According to a first aspect of the invention, there is provided a controller for a temperature management system for heating and/or cooling a room in accordance with a schedule of set point temperatures over a control period, the controller comprising a data processor arrangement; a temperature input for receiving a signal indicative of the current temperature in the room; a control output for supplying control signals to the system; and at least one electronic memory for storing said schedule of set point temperatures, a relationship, based on known heating or cooling characteristics of the room, between the energy supplied to the system in a portion of the control period and the predicted temperature of the room during that portion and subsequent portions of the control period, a first parameter value representative of the cost of supplying said energy and a second parameter value representative of a predetermined acceptability of variations of the actual or predicted temperature of the room from the set point schedule, wherein processor arrangement is operable to calculate, for each said portion, the energy to be supplied to the system in order for a plurality of parameter values to satisfy a predetermined criterion, said plurality of parameter values comprising said first parameter value and said second parameter value.

Thus a controller in accordance with the present invention can provide control for a temperature management system which not only takes into account the schedule of set point temperatures, but also a balance between the cost or notional cost of maintaining room temperature in accordance with the schedule and the effect of departures from that schedule. This enables the control of the temperature management system to be optimised so as to achieve the most effective use of energy to maintain the room at a comfortable temperature. The controller also takes into account the effect of an energy input in a given portion of the control period on the room temperature in that portion and also in subsequent portions of the period.

The controller may to advantage be preprogrammed with said relationship between the energy supplied to the systems in a portion of the control period and the predicted temperature of the room during that and subsequent portions of the control period stored in the memory, and is preferably arranged for the user to enter the set point temperature schedule.

Preferably, the criterion is applied to the sum of the parameter values.

In this case, the criterion is preferably that the sum of the two values is substantially at a minimum.

This enables the energy supplied to the system to be such that unnecessary heating/cooling, having regard to the acceptability (i.e. tolerance) defined by the second parameter value, can be avoided.

The sum may, for example, be substantially at a minimum at the actual turning point defining the minimum or at an approximate minimum determined by an iterative process such as the gradient descent method or the Newton's method.

Preferably, the approximate minimum is determined by the Primal-dual barrier function method.

Preferably, the sum is of the values over the whole control period.

Preferably, the data processor arrangement is operable to update said calculations for each of the portions over the course of the control period. This enables departures of the current temperatures from those previously predicted to be taken into account.

The control period may conveniently be of 24 hours' duration, each portion being of 15 minutes' duration so that the period is constituted by 96 consecutive portions.

The first parameter value may to an advantage comprise the product of the energy to be supplied to the system and an energy cost multiplier.

This multiplier may vary over the course of the control period to take into account variations in the actual cost of consuming energy, as happens in the case of a smart grid electrical energy supply system, where the cost per unit of energy (usually electrical energy) supplied will vary or in the efficiency of the system, for example in the case of a heat pump, the efficiency of which will vary greatly with the temperature difference between the heat source and the heat sink of the pump.

Preferably, the second parameter value comprises the product of a comfort cost multiplier and the difference between the set point temperature and the actual or predicted temperature at the time. The second parameter value can thus be considered to be a discomfort cost.

Thus, the second parameter value can be expressed as a discomfort cost, for example to an occupier of the room.

The criterion, with these two types of parameter value may be that said total is minimised, subject to a fixed energy cost. Thus the user could specify the cost of energy to be consumed, and in response, the controller will determine a control schedule which achieves this with minimum discomfort cost.

As with the cost multiplier for the first parameter value, the discomfort cost multiplier may vary over the course of a day/control period to account for, for example, levels of occupancy of the room, or the likely activity level of an occupant. Thus, the multiplier might be lower at night, when the occupant is in bed.

Preferably, said relationship is based on a heat transfer model that takes into account at least one of:
(a) the heat capacity and thermal transfer properties of the temperature management system;
(b) the heat capacity and thermal transfer properties of the thermal mass of the room; and
(c) the thermal transfer properties between the room and the external environment.

Preferably, the properties listed at (c) above include the forecasted temperatures of the environment outside the room over the control period.

The way in which the temperature management system is controlled to have the calculated amount of energy supplied to it may depend on the nature of the temperature management system itself. For example, where such a system comprises a boiler, the only type of allowable control of the boiler's operation may be switching the boiler (or its burner) on or off. However, in this case the controller may control the boiler by means of a suitable algorithm that simply turns the boiler on for a sufficient proportion of the portion for the calculated amount of energy for that portion to be supplied to, and hence consumed by, the boiler. For example the control system may supply the boiler with a control signal in the form of a series of pulses, each of which defines a period when the boiler is on. This signal can be pulse code modulated to provide short term control for the amount of energy delivered. Such modulation may be subject to conditions arising from operational constraints on the boiler, for example a minimum interval between successive activating pulses, to avoid damage or excessive wear to the temperature management system.

Alternatively, however, the controller may be operable, during each portion, to use the predicted temperature profile associated with the calculated energy inputs as a target for the boiler and to compare this profile with further predicted temperatures for a part of the control period for different periods of activation or deactivation of the boiler's burner, an on-off control sequence being selected from a number of possible sequences to provide a profile of said further predicted temperatures that most closely matches the temperature profile.

In this case the predicted temperature profile is used as an expression of the calculated amounts of energy to be supplied for each portion of the control period.

According to a second aspect of the invention, there is provided a method of controlling a temperature management system for controlling the temperature of a room in accordance with the schedule of set point temperatures over a control period, the method comprising the steps of:
(a) determining from known or predicted heating and/or cooling characteristics of a room a relationship between the series of predicted temperatures of the room in each of a succession of portions of the period and the energy supplied to the system in each of those portions; and
(b) for each portion, using said relationship to calculate the amount of energy to be supplied in order for a first parameter value representative of the cost of supplying that energy and a second parameter value representative of a predetermined tolerance of variations of the predicted temperatures from the set point schedule to satisfy a predetermined criterion.

The invention can more generally be seen as enabling the formulation of a control strategy for a system, which strategy balances one parameter value (for example a value related to the cost of operating the system) against another parameter value that has an antagonistic relationship to the first value (for example a cost attributable to the non-compliance of the system with a predetermined schedule).

Thus the invention also lies in a controller for an apparatus management system for managing a quantitative characteristic of an apparatus in accordance with a schedule of set point values for the characteristic over a control period, the controller comprising an input for receiving data on the current value of said characteristic, a control output for supplying control signals to the system and at least one electronic memory for storing said schedule, a relationship between the control output in a portion of the control period and the predetermined value of the characteristic during that and subsequent portions of the control period, a first parameter value representative of the cost of energy supplied to or consumed by the system in response to said control signals and a second parameter value representative of the acceptability of variations of the actual or predicted value of the characteristic from the set point schedule, the controller further comprising a data processor arrangement which is operable to calculate, for each set portion, the energy to be supplied to or consumed by the system in order for a plurality of parameter values to satisfy a predetermined criterion, said plurality of parameter values comprising said first parameter value and said second parameter value.

In the examples of the controller described and illustrated below, the characteristic is temperature and the first and second values are the energy and discomfort costs. However, the invention may be applied to other types of apparatus management systems, for example a plug-in series electric hybrid vehicle management system for controlling the amount of charge to be supplied to the batteries of the vehicle by the vehicle's internal combustion engine. In such a case, the first parameter value may comprise the cost of fuel consumed by the internal combustion engine, and the second value the acceptability of variations from the desired maximum speeds at which the vehicle may travel over the course of a journey.

BRIEF DESCRIPTION OF THE DRAWINGS

The invention will now be described, by way of example only, with a reference to the accompanying drawings in which:—

DETAILED DESCRIPTION

Figure 1:
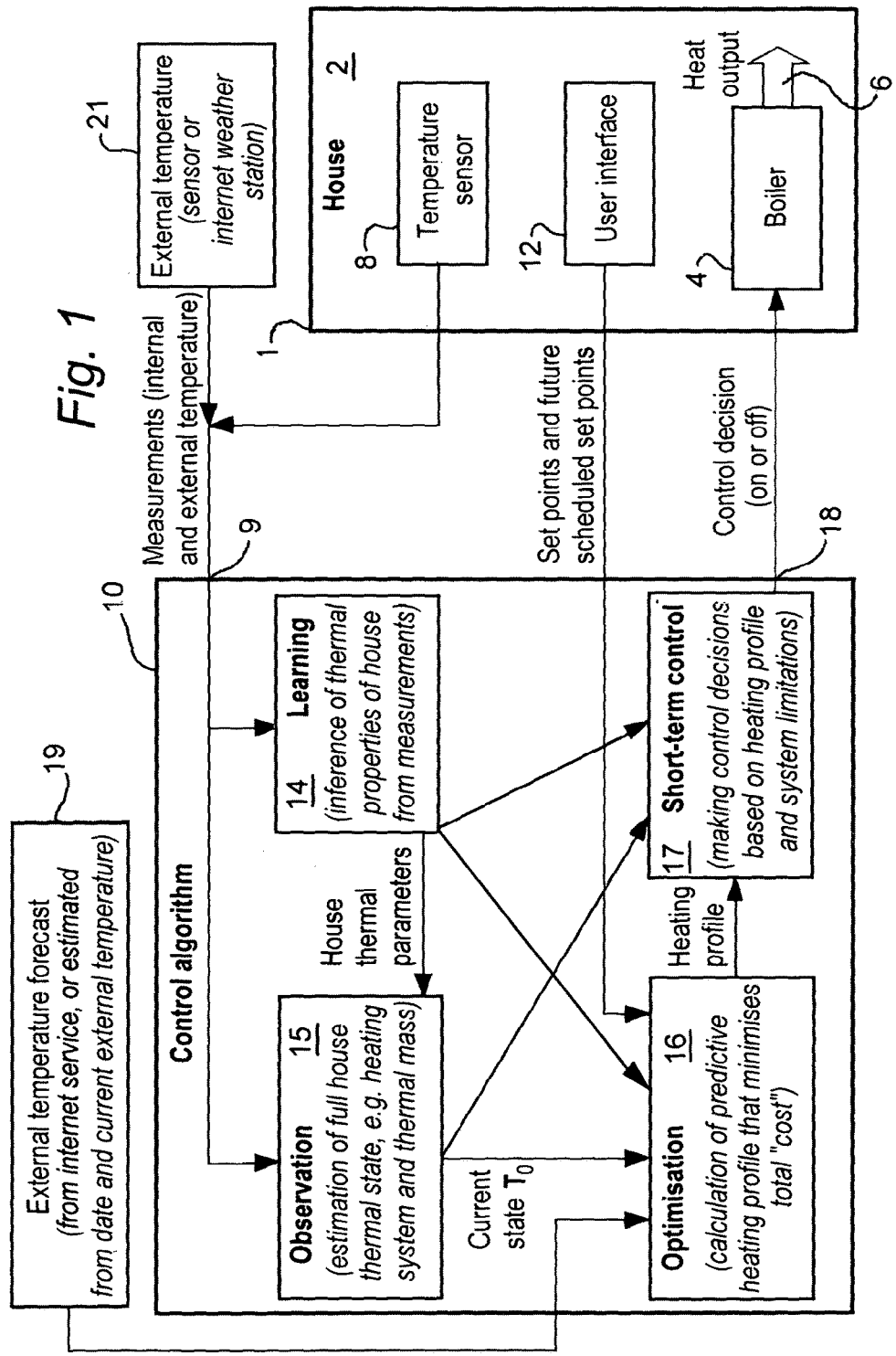
FIG. 1 is a functional block diagram illustrating the interaction between a controller in accordance with the invention and a house fitted with a boiler to be controlled by the controller.

In FIG. 1, the reference numeral 1 denotes a house having one or more rooms 2 to be heated by a temperature management system comprising a boiler 4 linked to a heat delivery system 6 such as a set of radiators. Although the invention is described in relation to a boiler-based heating system, the benefits provided by the controller according to the invention are also applicable to other types of temperature management systems, in particular heat-pump based, heating and/or cooling systems.

A temperature sensor in the house (or a respective sensor in each room) is denoted by reference numeral 8 and feeds an output representative of the detected temperature to an input 9 of a controller 10 in accordance with the invention. The controller 10 also has an input for control signals from a user interface 12 within the house 1. The user interface 12 can be used by a user to set up a schedule of set point temperatures over a control period (for example, a full day) and may also enable the user to specify the acceptability of variations from the set point temperature schedule, i.e. how hard the heating system has to work in order to strive to maintain the temperature within the room(s) of the house in accordance with the set point schedule. The acceptability parameter could be manifested as a comfort versus economy input value. The user may also specify that the acceptability of variations may itself change over the course of the control period.

The controller 10 takes the form of a data processor arrangement comprising a computer programmed to perform the various tasks presented by functional blocks 14-17, and these are discussed below. It will be appreciated that the computer has an electronic memory on which said schedule is stored. The memory also stores data relating the energy supplied to/consumed by the boiler 4 in each portion of the control period to the temperature, predicted by the controller, during that portion and subsequent portions of the control period. In addition the computer memory stores first and second parameter values described above. The controller 10 is also connected to an external computer network 19, such as the Internet, over which it obtains a forecast for the temperatures in the external environments (and optionally current temperature data) in the region of the house 1 over the course of the control period. The controller may receive further external temperature data from a local external temperature sensor 21 mounted on the exterior of the house 1, and directly connected to the controller 10.

Figure 2:
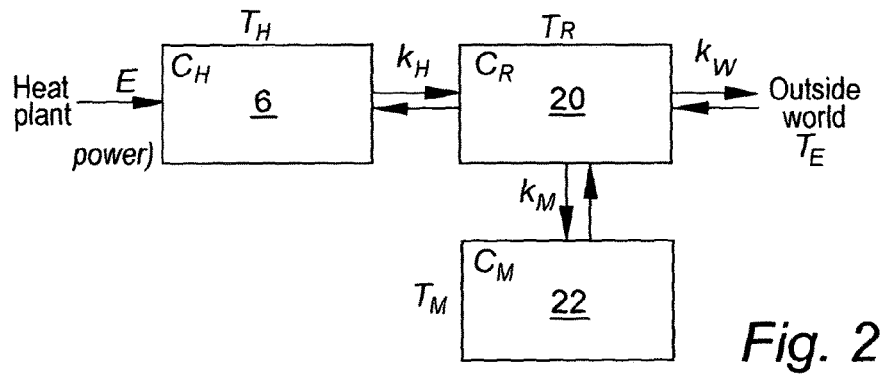
FIG. 2 is a block diagram representation of a thermal model used, in effect, by the controller to predict future temperatures of the interior of the house in response to different energy inputs to the boiler.

Although the controller 10 is shown outside of the house 1, it will be appreciated that in reality the controller 10 will be accommodated within the house. The controller 10 has an output 18 over which it supplies control signals for switching the boiler 4 on and off. The functional control blocks 14-17 perform various data processing steps based on a thermal model of the house 1 as shown in FIG. 2. This model is used to relate the external temperature, $T_E$, as forecast in the information obtained over the network 19 and the energy to be supplied by the boiler 4 to the resultant room temperature $T_R$ in the house 1. The function represented by the block 14 is the learning of the thermal properties of the house. One such property is the heat capacity of the room, i.e. the amount of heat energy required to raise the air temperature in the room by 1° C. The temperature in the room will also be influenced by the thermal mass within the room. Typically, the thermal mass will be primarily constituted by solid objects and/or surfaces within the room itself which are disconnected from heat delivery system 6, but with which the room can exchange heat. The learning block 14 also includes the function of inferring the heat transfer characteristics between the room(s) and the outside world. Thus the functions represented by the block obtain the known heating and cooling characteristics of the room(s).

The functional block 15 represents the initial estimate of the thermal state of the house at the start of a control period. The thermal state will be constituted by the air temperature of the room(s), $T_R$, the temperature of the heat delivery system 6, $T_H$, and the thermal mass temperature, $T_M$. $T_R$ can be measured using the temperature sensor 8 whilst the other two temperatures can be estimated: $T_M$ can be treated as being the same as the room temperature (on the assumption that initially the house is in a steady state), whilst $T_H$ can be treated as being a predetermined temperature (e.g. the normal operating temperature of the radiators, say 65° C. if the boiler 4 is operating, but room temperature otherwise).

The outputs from the learning and observation functions can be used to predict the effect of the energy supplied to the boiler during one portion of a trial period on the temperature of the room in that and in subsequent portions of the trial period. That effect can also be taken into account in the calculation of the effect of supplying energy during the next portion on the room temperature on the rest of the control period, and so on. The optimisation calculations that relate the energy to be supplied to the boiler to the resultant temperature profile of the room and, using inputs from the interface 12 calculate a suitable energy input schedule, and the resultant predicted temperature profile for the room, are described below. In this particular instance, the output from the optimisation function is in the form of the calculated temperature profile which the short term control function uses to determine when to activate and deactivate the boiler 4 over the control period. The operation of, and theory behind, the calculations used by the controller 10 will now be described with further reference to the model shown in FIG. 2.

The optimisation calculations are based on a core model (for a "model predictive control" strategy).

FIG. 2 is a simple physics model, with three blocks that can hold heat and transfer heat between each other. These are (a) the heating system 6 (radiators, underfloor, etc)—which is directly heated by the heat plant;

(b) the room 20—which is heated by the heating system, and loses heat to the outside world; and (c) the remaining "disconnected" thermal mass 22 of the house—which can exchange heat with the room (only).

Each of these has a heat capacity C (i.e. quantity of thermal material, taking a certain amount of energy to raise its temperature T), and each link has a thermal conductance k. The heat capacities and thermal conductances constitute the known heating or cooling characteristics of the room.

The energy flow between the blocks is represented by arrows.

The physics can be written as three coupled linear differential equations for the conduction of heat between each block and the resulting change in temperature:

$$C_R \frac{dT_R}{dt} = k_H(T_H - T_R) - k_W(T_R - T_E) + k_M(T_M - T_R)$$

$$C_H \frac{dT_H}{dt} = E - k_H(T_H - T_R)$$

$$C_M \frac{dT_M}{dt} = -k_M(T_M - T_R)$$

There is an approximation here. Radiators (and also underfloor heating) transfer heat to the room by convection and radiation as well as conduction, which means there is a non-linear relationship between temperature difference and heat transfer. Nevertheless, we can regard the above equations as a linearised approximation around a "baseline" temperature difference, and iterative corrections can if necessary be made for the non-linearity.

A matrix formulation means that the above equations can be more simply represented, and also provides an elegant framework for manipulating sets of temperatures—particularly when we need to manipulate time series of sets of temperatures. This approach is known as a "state space" formulation and is a more modern replacement for the more traditional "transfer function" approach to control theory.

The differential equations above can be rewritten in matrix form as:

$$\frac{dT}{dt} = \underline{A}_d T(t) + \underline{B}_d E(t) + \underline{F}_d T_E(t) \quad (1)$$

where T is a vector of temperatures $$T = \begin{pmatrix} T_R \\ T_H \\ T_M \end{pmatrix}$$

and the other symbols are matrices or vectors of the thermal parameters of the house {C, T, k}. The suffix d indicates that these matrices and vectors are differential. Explicitly, $$\underline{A}_d = \begin{pmatrix} \frac{-k_H - k_W - k_M}{C_R} & \frac{k_H}{C_R} & \frac{k_M}{C_R} \\ \frac{k_H}{C_H} & \frac{-k_H}{C_H} & 0 \\ \frac{k_M}{C_M} & 0 & \frac{-k_M}{C_M} \end{pmatrix};$$

$$\underline{B}_d = \begin{pmatrix} 0 \\ \frac{1}{C_H} \\ 0 \end{pmatrix};$$

$$\underline{F}_d = \begin{pmatrix} \frac{k_W}{C_R} \\ 0 \\ 0 \end{pmatrix}$$

The zeros arise from the assumption that there is no direct heat transfer between the heating system and the thermal mass of the house. In this case there are 6 independent parameters that describe our house model (whether or not the true boiler power is known).

For short time periods, this can be used as a difference equation for updating the temperatures, but for longer time periods this will be inaccurate, and it is necessary to integrate the equation. This can be done analytically for a first order linear differential equation:

$$T_{k+1} = \underline{A} T_k \underline{B} E_{k+1} \underline{F} T_{E,k+1} \quad (2)$$

where $\underline{A}$=expm ($\underline{A}_d$ $\Delta t$), $\underline{B}=(\underline{A}-\underline{I})\underline{A}_d^{-1}\underline{B}_d$ and $\underline{F}=(\underline{A}-\underline{I})\underline{A}_d^{-1}\underline{F}_d$ and $\Delta t$ is the time interval between k and k+1, k representing the portion of the control period and k+1 the next portions. We have approximated energy input $E_{k+1}$ as the average energy input between step k and k+1, etc. The matrix function expm( ) is the "matrix exponential" which can be calculated with standard methods (once only for fixed house parameters and time-step). The advantage of this formulation is that we can predict temperature evolution with a simple matrix multiplication. In this example the duration of the control period is 24 hours and each portion is of 15 minutes' duration, so that k ranges from 1 to 96 inclusive.

In order to optimise heating control, a cost functional is required that reflects what we are trying to achieve. We wish to minimise energy consumption and discomfort; we assume that discomfort can be quantified by how much the temperature is below the user's setpoint. Hence (in discrete form):

$$\text{Cost } Q = \Sigma_k (Q_k^E E_k + Q_k^T f(T_{sp,k} - T_R)) \quad (3)$$

where the function $f(\Delta T)$ specifies the cost of an individual temperature's variation from set point. In the simplest case $f(x)=0$ (x<0): $f(x)=x$ (x>0), giving a linear penalty for temperatures below set point and no discomfort cost for temperatures above set point. $Q_k^E$ is the energy cost multiplier, i.e. the cost per unit energy and $Q_k^T$ is the comfort cost multiplier, i.e. the cost per degree-hour (if $\Delta t$ is measured in hours).

Both of the costs and the set point can be specified for each time-step, to reflect variable energy tariff, or changes in desired comfort level through the day. The controller may be set up so that, instead of inputting a comfort cost multiplier via the interface 12, the user simply specifies the ratio of the two multipliers as the cost is arbitrary to an overall multiplier; in this case one parameter $Q_E/Q_T$ specifies the user's choice of comfort vs economy.

It would also be possible to include a penalty for being too much above a set point—for example some people like it to be cool at night—or an additional penalty for being too much below set point (e.g. "minimise my energy consumption but never let it be more that 2 degrees below set point"). The system design is scalable to including these new parameters.

It will be appreciated that the superscripts E and T in equation (3) denote the energy and discomfort cost multipliers respectively, not Q raised to the power E or T.

To calculate the optimal heating profile, we need to determine the $\{E_k\}$ that minimises the cost Q. This is an N-dimensional minimisation problem, where N is the number of time-steps k we want to include.

Prior information required before optimisation is the initial state $T_0$. The room temperature component of this will be measured, but the other components need to be estimated. A guess is adequate (radiator temperature is may be 65° during heating, at room temperature otherwise; thermal mass temperature is the same as room temperature), but a better method is to use an observer such as a Kalman filter (just requires the state evolution equations above and estimates of process and measurement noise).

We can express the temperature state at each of N times in the future as a linear matrix function of the energy input at each time in the future. Specifically, from the equation constructed above:

$$T_{k+1} = \underline{A}T_k + \underline{B}E_{k+1} + \underline{F}T_{E,k+1}$$

We start from k=0 ($T_0$ is our known initial state):

$$T_2 = \underline{A}(\underline{A}T_0 + \underline{B}E_1 + \underline{F}T_{E,1}) + \underline{B}E_2 + \underline{F}T_{E,2} = \underline{A}^2 T_0 + \underline{A}\underline{B}E_1 + \underline{B}E_2 + \underline{A}\underline{F}T_{E,1} + \underline{F}T_{E,2}$$

and in general $$T_N = \underline{A}^N T_0 + \underline{A}^{N-1}\underline{B}E_1 + \underline{A}^{N-2}\underline{B}E_2 + \ldots + \underline{B}E_N + \underline{A}^{N-1}\underline{F}T_{E,1} + \underline{A}^{N-1}\underline{F}T_{E,2} + \ldots + \underline{F}T_E,$$

$\mathcal{T} = (T_{R,1}, T_{H,1}, T_{M,1}, T_{R,2}, T_{H,2}, T_{M,2} \ldots T_{R,N}, T_{H,N}, T_{M,N})^T$:(3N×1) where the final superscript T indicates a matrix transpose, creating a column vector.

This allows us to write a matrix expression for the temperature states at every time as a function of the initial temperature state, and the energy input and external temperature at every time step. Explicitly, this uses the following matrices (constructed iteratively and representing the forward propagation of the predictions of the model):

$$\mathcal{A} = \begin{pmatrix} \underline{A} \\ \underline{A}^2 \\ \vdots \\ \underline{A}^N \end{pmatrix};$$

$$\mathcal{B} = \begin{pmatrix} \underline{B} & 0 & 0 & \ldots & 0 \\ \underline{AB} & \underline{B} & 0 & \ldots & 0 \\ \underline{A}^2\underline{B} & \underline{AB} & \underline{B} & \ldots & 0 \\ \vdots & \vdots & \vdots & \vdots & \vdots \\ \underline{A}^{N-1}\underline{B} & \underline{A}^{N-2}\underline{B} & \underline{A}^{N-3}\underline{B} & \ldots & \underline{B} \end{pmatrix};$$

$$\mathcal{F} = \begin{pmatrix} \underline{F} & 0 & 0 & \ldots & 0 \\ \underline{A}\underline{F} & \underline{F} & 0 & \ldots & 0 \\ \underline{A}^2\underline{F} & \underline{A}\underline{F} & \underline{F} & \ldots & 0 \\ \vdots & \vdots & \vdots & \vdots & \vdots \\ \underline{A}^{N-1}\underline{F} & \underline{A}^{N-2}\underline{F} & \underline{A}^{N-3}\underline{F} & \ldots & \underline{F} \end{pmatrix}$$

The matrix (sizes are $\mathcal{A}$:(3N×3) $\mathcal{B}$:(3N×N) $\mathcal{F}$:(3N×N)), when expanded to show all the terms of $\underline{A}$, $\underline{B}$ and $\underline{F}$.

The set of temperature predictions for the time period $\mathcal{T} = (T_{R,1}, T_{H,1}, T_{M,1}, T_{R,2}, T_{H,2}, T_{M,2} \ldots T_{R,N}, T_{H,N}, T_{M,N})^T$:(3N×1) where the final superscript T indicates a matrix transpose, creating a column vector These can be calculated from the initial conditions, energy input $E = (E_1, E_2, \ldots E_N)^T$ and external temperatures using these matrices as:

$$\mathcal{T} = \mathcal{A} T_0 + \mathcal{B} E + \mathcal{F} T_E \quad (4)$$

where $T_0 = (T_R^0, T_H^0, T_M^0)^\mathcal{T}$, the initial temperatures before the first time-step, and where $$T_E = (T_{E,1}, T_{E,1}, \ldots T_{E,N,})^T$$

is the vector of external temperatures. (Note nomenclature changed slightly here to distinguish between the different types of vector) This enables the predictions of the model at every time point in our range to be calculated with a simple matrix multiplication. The superscript T used in the expressions of E, and $T_0$ denotes the matrix transpose function, not that the matrix is raised to the power T. The term $\mathcal{A} T_0$ represents the initial conditions in the control period, $\mathcal{B}E$ E relates to the effect of operating the boiler at any stage in the control period on temperature at that and any subsequent stage in the control period, whilst $\mathcal{F} T_E$ accounts for the effects of external temperatures.

All the matrices above are a little complex to use as they contain predictions for all three model temperatures. Most of the time we just want to see the effect of energy on room temperature, and for this we pick out selected rows. If we use the superscript R to indicate the rows in the matrices corresponding to room temperatures R, i.e. rows 1, 4, 7, . . . 3N−2 we can write the room temperature as:

$$T_R = \mathcal{A}^R T_0 + \mathcal{B}^R E + \mathcal{F}^R T_E, \text{ where the matrices have sizes}$$

$\mathcal{A}^R$:(N×3) $\mathcal{B}^R$:(N×N) $\mathcal{F}^R$:(N×N).

We define $T_{R,offset} = \mathcal{A}^R T_0 + \mathcal{F}^R T_E$, a fixed vector for given starting temperatures and external temperature forecast. We can now rewrite the cost function using matrix indexing:

$$Q = \Sigma_j Q_{(j)}^E E_{(j)} + \Sigma_i Q_{(i)}^T f(T_{sp,(i)} - T_{R,offset,(i)} - \Sigma_j \mathcal{T}^R_{(i,j)} E_{(j)}) \quad (5)$$

with i and j ranging from 1 to N. This is Eqn 3 rewritten with the dependence of $T_R$ on the energy input E made explicit. Note that the superscript R in the previous equations denotes a matrix formed from only the rows corresponding to room temperature, not a matrix raised to the power R.

The aim now is to calculate the vector of energy inputs E that minimises the cost Q(E) subject to a number of constraints. There are many established techniques for solving this type of problem, and we can formulate it in the standard form:

Minimise Q(E) subject to c(E)≥0 and g(E)=0 where c and g are vector functions producing any number of outputs (matched by the vector 0 on the RHS). g enables inclusion of equality constraints which are not required by the initial formulation above, but would enable e.g. fixed energy input solutions to be calculated if required. In most situations, c and g are linear and just matrix multiplications.

Intuitively, minimising this functional involves adjusting each of the N dimensions of E to reduce the total cost.

We consider below three different methods for solving the optimisation problem.

1. Linear Programming

This method requires that Q, c and g are linear. This means the function $f$ must be piecewise linear. We consider the simple case described after Eqn 3: $f(x)=0$ $(x<0)$; $f(x)=x$ $(x>0)$, and to that end we need to introduce a vector of auxiliary variables $\epsilon \geq T_{sp} - T^R$. Now we can write:

$$Q(E, \epsilon) = (Q_E \ Q_T)\begin{pmatrix} E \\ \epsilon \end{pmatrix} = Q\begin{pmatrix} E \\ \epsilon \end{pmatrix}$$

$$c(E, \epsilon) = \begin{pmatrix} I & 0 \\ -I & 0 \\ 0 & I \\ B^R & I \end{pmatrix} \begin{pmatrix} E \\ \epsilon \end{pmatrix} + \begin{pmatrix} 0 \\ E_{max} \\ 0 \\ T^R_{offset} - T_{sp} \end{pmatrix}$$

$$= a\begin{pmatrix} E \\ \epsilon \end{pmatrix} + b$$

defining new matrices, Q(1×2N), a (5N×2N), and b (5N×1).

The rows of c correspond respectively to E>0, E<max, $\epsilon$>0, $\epsilon \geq T_{sp} - T^R$.

(Note that this excludes for simplicity constraints on the maximum temperature of the heating system which can be achieved by adding a further set of rows to a and b similarly to the last above.).

These matrices can be passed straightforwardly to the Octave interface[1] to GLPK[2] with the following syntax

[1] http//www.gnu.org/software/octave/doc/interpreter/Linear-Programming.html
[2] http//www.gnu.org/software/glpk/

$$\begin{pmatrix} E \\ \epsilon \end{pmatrix} = glpk(Q^T, a, -b, [], [], \text{``}LL \ldots L\text{''}, \text{``}CC \ldots C\text{''}, 1)$$

to produce via standard linear programming the solution E.

2. Gradient Descent

This method no longer requires that Q(E) is linear and so enables solution of heat pump control problems (see section below) and non-linear cost functions (e.g. $f$). The method is intuitive but is slow in the vicinity of constraints, which are better dealt with by a barrier function method (see below), but it provides an easily describable algorithm for the non-linear case.

For gradient descent we also need to calculate the gradient $\nabla Q$. For the simple linear f form of $f$ this is:

$$\frac{\partial Q}{\partial E_{(j)}} = Q^E_{(j)} + \sum_{i: T(i) < T_{\delta p, (i)}} Q^T_{(i)} B^R_{(i,j)}$$

The optimisation algorithm for gradient descent is as follows:

1. Decide on $\Delta t$, N; determine house thermal parameters (see learning below); pre-calculate $B^R$ and $T_{offset}$; get future set points and external temperature forecast.
2. Determine the initial internal state $T_0$ (by guess or Kalman filter).
3. Decide on an initial guess of the energy input profile E (suggested to be very small but not quite zero).
4. Calculate the gradient (above).
5. Adjust the energy with a multiple of the gradient: $E \rightarrow E - \alpha \nabla Q$ using $\alpha$ sufficiently small that constraints are not violated.
6. Calculate the resulting water temperature, and reduce the relevant entries $E_j$ so that they are (a) below or equal to the maximum boiler output power and (b) so that the water temperature doesn't exceed maximum; recalculate temperature profiles.
7. Iterate back to step 4 until some stopping criterion reached (e.g. cost no longer reducing much, or fixed number of iterations).

3. Primal-Dual Barrier Function Method

This method has two significant advantages over the gradient descent method: constraints are dealt with elegantly and efficiently, and the full Newton's method can be used to improve convergence speed. Non-linear cost functions are supported. This is the method we have found to work best, and is still a standard method in the scientific literature[3].

[3] George B. Dantzig and Mukund N. Thapa. 2003. Linear Programming 2: Theory and Extensions. Springer-Verlag.
Margaret H. Wright (2005). "The interior-point revolution in optimization: history recent developments, and lasting, consequences". Bull. Amer. Math Soc. (N.S), Vol 42. pp. 39-56. http://citeseerx.ist.psu.edu/viewdoc/summary-?doi=10.1.1.97.8349. Retrieved 21 Feb. 2011.
Bonnans, J Frédéric; Gilbert, J. Charles; Lemaréchal, Claude; Sagastizábal, Claudia A. (2006). *Numerical optimization: Theoretical and practical aspects*. Universitext (Second revised ed. of translation of 1997 French ed.). Berlin: Springer-Verlag. pp. xiv+490. doi:10,1007/978-3-540-35447-5. ISBN 3-540-35445-X. MR2265882. http://www.springer.com/mathematics/applications/book/978-3-540-35445-1.
Karmarkar, Narendra (1984). "*A New Polynomial Time Algorithm for Linear Programming*", Combinatorica, Vol 4, no. 4, pp. 373-395.
Mehrotra, Sanjay (1992). "On the implementation of a primal-dual interior point method", *SIAM Journal on Optimization*, Vol. 2, no. 4, pp. 575-601.
Nocedal, Jorge; and Stephen Wright (1999). *Numerical Optimization*. New York, N.Y.: Springer. ISBN 0-387-98793-2.
Press, W H; Teukolsky, S A; Vetterling, W T; Flannery, B P (2007). "*Section 10.11. Linear Programming: Interior-Point Methods*". *Numerical Recipes: The Art of Scientific Computing* (3rd ed.). New York: Cambridge University Press. ISBN 978M-521-88068-8. http://apps.nrbook.com/empanel/index.html#pg=537.
Wright, Stephen (1997). *Primal-Dual Interior-Point Methods*. Philadelphia, Pa.: SIAM. ISBN 0-89871-382-X Similarly to the linear programming method, auxiliary variables $\epsilon$ are required representing the temperature delta below set point. There are five constraints (for each time point):

1. $\epsilon$ greater than or equal to zero
2. $\epsilon$ greater than or equal to temperature delta below set point
3. System water temperature less than maximum value
4. Energy input greater than or equal to zero
5. Energy input less than maximum For each of these we introduce a logarithmic barrier function multiplied by a single common variable μ, together with a dual variable (Lagrange multiplier) for each dimension of each constraint. We also need the ability to calculate the Hessian matrix of the cost Q with respect to the energy inputs E.

The optimum solution is calculated using a multi-dimension Newton gradient descent method, and the barrier functions gradually reduced as the solution becomes closer to optimum.

The steps in this algorithm are as follows:
1. Construct initial system matrices as previously, including constraint matrices
2. Make an initial guess for energy input (either from previous time-step or near zero), and barrier multiplier $\mu$
3. Calculate cost and cost gradient
4. Either (a) continue line search in current direction or (b) calculate descent direction according to the interior point method, and choose a multiplier $\alpha$ small enough that constraints are satisfied.
5. Calculate new energy input
6. If change since last time is sufficiently small, reduce $\mu$. Finish if $\mu$ is sufficiently small (and change since last time was sufficiently small), otherwise iterate back to Step 3.

The standard barrier function (or interior point) method additionally allows for the specification of equality constraints in the form of the matrix equation Ax=b, through the addition of further Lagrange multipliers and some extensions to the internal formulation. This provides a straightforward means of specifying a fixed energy $E_{total}$ such that $\Sigma_i E_i = E_{total}$, and using the above optimisation to calculate the optimal distribution of the energy. Alternatively, the discomfort cost can be fixed as a linear matrix equation in E as:

$$\Sigma_{i: T(i) < T_{sp(i)}} Q_{(i)}^T (T_{sp,(i)} - T_{offset,(i)}^R - \Sigma_j B_{(i,j)}^R E_{(j)}) = Q_{total}$$

4. Linear Programming with Equality Constraints

The linear programming method above can be easily adapted for the fixed energy input requirement. We redefine the matrices a and b so that there is an additional row specifying the equality constraint on the total energy (being the sum of the elements of E):

$$c(E, \epsilon) = \begin{pmatrix} I & 0 \\ -I & 0 \\ 0 & I \\ B^R & I \\ 1 1 \ldots 1 & 0 \end{pmatrix} \begin{pmatrix} E \\ \epsilon \end{pmatrix} + \begin{pmatrix} 0 \\ E_{max} \\ 0 \\ T_{offset}^R - T_{sp} \\ -E_{total} \end{pmatrix} = a \begin{pmatrix} E \\ \epsilon \end{pmatrix} + b$$

and pass these matrices as before to GLPK, specifying the last constraint as an equality constraint:
=glpk (, [ ], [ ], "LL ... LS", "CC ... CC", 1).

Extension to Heat Pumps

If the house has a heat pump instead of a boiler, it is necessary to separate the power input to the plant (i.e. electricity) from the thermal energy delivered to the heating system, as their relationship varies quite a lot, and is highly dependent on the resulting system state (i.e. water temperature).

Our model for an air source heat pump is that the thermal power E provided by the heat pump when driven by electrical power P is $$E = COP \, P = k_{HP} \frac{273.15 + T_H}{T_H - T_E} P$$

where $k_{HP}$ is the thermodynamic effectiveness of the heat pump, assumed to be a fixed value for a particular heat pump.

To carry out the optimisation it is necessary to work with the thermal power E as our variable as otherwise the propagation step (calculating $\mathcal{T}$) becomes non-linear and potentially time-consuming. The energy cost term is dependent on P not E so $$Q(E) = \sum_i Q_{(i)}^E \frac{1}{k_{HP}} \frac{T_{(i)}^H - T_{(i)}^E}{273.15 + T_{(i)}^H} E_{(i)} + \sum_i Q_{(i)}^T f\left(T_{sp,(i)} - T_{offset,(i)}^R - \sum_j B_{(i,j)}^R E_{(j)}\right)$$

using a temperature cost function $f$ as previously.

This equation is missing a particular subtlety: We need the dependence of Q on E, but the heating system temperature $T_{(j)}^H$ is a function of E, as energy input causes the radiators etc to get hot and at the same time reduce the efficiency of the heat pump. These are critical terms to include: not only do changes in energy directly impact the cost, they also impact the coefficient of performance and impact the cost indirectly because of this—important for heat pump optimisation.

As previously for $T^R$, we can define $T_{offset}^H = \mathcal{A}^H T_0 + \mathcal{F}^H T_E$ (where the suffix H indicates e.g. $\mathcal{A}$ with the rows relevant to the heating system pulled out, i.e. $\mathcal{T}^H = (\mathcal{A}^H T_0 + \mathcal{B}^H E + \mathcal{F}^H T_E)$), and write:

$$T_{H,(i)} = T_{offset,(i)}^H + \Sigma_j \mathcal{F}_{(i,j)}^H E_{(j)}$$

(this is incidentally the same formulation that is required to implement a maximum heating system temperature constraint for the non-heat pump case).

Hence, we can write Q with its full dependence on E shown explicitly:

$$Q(E) = \sum_i Q_{(i)}^E \frac{1}{k_{HP}} \frac{T_{offset,(i)}^H + \Sigma_j B_{(i,j)}^H E_{(j)} - T_{(i)}^E}{273.15 + T_{offset,(i)}^H + \Sigma_j B_{(i,j)}^H E_{(j)}} E_{(i)} + \sum_i Q_{(i)}^T f(\ldots)$$

where $f(\ldots)$ is the same as previously. This is now our fully specified cost function for a heat pump, and is clearly non-linear in E. The optimisation problem can be solved by either of the second two methods above (although not linear programming due to the nonlinearity).

Gradient Descent (Heat Pump)

This method requires an explicit function for the gradient of Q with respect to E. This is slightly simplified if we note that $$\frac{\partial T_{(i)}^H}{\partial E_{(j)}} = B_{(i,j)}^H$$

and so finally for the air source heat pump this gradient $\nabla Q$ is:

$$\frac{\partial Q}{\partial E_{(j)}} = Q_{(j)}^E \frac{1}{k_{HP}} \frac{T_{(j)}^H - T_{(j)}^E}{273.15 + T_{(j)}^H} - \sum_i Q_{(i)}^E \frac{1}{k_{HP}} \frac{B_{(i,j)}^H}{273.15 + T_{(i)}^H} E_{(i)} -$$

-continued $$\sum_i Q^E_{(i)} \frac{1}{k_{HP}} \frac{T^H_{(i)} - T^E_{(i)}}{(273.15 + T^H_{(i)})^2} B^H_{(i,j)} E_{(i)} + \sum_{i: T(i) < T_{sp,(i)}} Q^T_{(i)} B^R_{(i,j)}$$

(for the simple form of $f$ again).

It will be appreciated that we are, in effect, performing matrix multiplications using indices to take care of which time step we're comparing with which. $B^H$ characterises the effect of E on water temperature, and $B^R$ characterises its effect on room temperature.

We can use this gradient within the same algorithm described above, taking care of the difference between electrical power provided to the heat pump and its output power. The heat pump's output power is constrained by a direct limit on the input power and so this limit must be updated each loop according to the current water temperatures. Similarly the heat pump has a maximum water temperature it can deliver (typically 60°).

Notes

Water temperatures can change quite rapidly in the course of one time-step, and if the initial temperature is used in the constraint, the algorithm can fail to reflect the disadvantage of putting in high power, and so can be unstable to spikes. A solution for this is, whenever a water temperature is used in the update loop, to use the average $$\frac{1}{2}(T^H_k + T^H_{k+1})$$

(on the assumption that the water temperature increases linearly within the timestep)—and the same calculation with matrix $B^H$ is also used in the gradient.

Extension to a ground source heat pump is fairly straight forward—just replace the forecast air temperature $T_E$ with the forecast temperature of the ground loop.

On a similar note, this approach may need alteration if applied to an air source heat pump with $CO_2$ refrigerant as it has different thermodynamics (i.e. the COP expression above is not valid).

Determination of House Thermal Parameters

The differential equations used to describe our model of the house are expressed as matrices $\underline{A}_d$, $\underline{B}_d$, $\underline{E}_d$, for use within the subsequent calculations. We can identify six independent parameters as making up these matrices, as described below.

Each of the parameters can be thought of as a timescale or rate for:
1. Room temperature to be affected by heating system: $r_1 = 1/\tau_{RH} = k_H/C_R$ (approx how quickly room warms up if radiators at const temp and no delta to outside)
2. Room temperature to be affected by external temperature: $r_2 = 1/\tau_{RW} = k_W/C_R$ (approx how quickly room cools down when heating off—outflow)
3. Room temperature to be affected by thermal mass: $r_3 = 1/\tau_{RM} = k_M/C_R$ (approx how quickly room heats from thermal mass)
4. Heating system to be affected by room temperature: $r_4 = 1/\tau_{HR} = k_H/C_H$ (approx how quickly radiators cool)
5. Thermal mass to be affected by room temperature: $r_5 = 1/\tau_{MR} = k_M/C_M$ (approx how quickly thermal mass charges/discharges)
6. Rate of change of temperature of heating system at given thermal energy input: $r_6^T = 1/\tau_{HE}^T = E/C_H$. This one is slightly different as it is not a pure timescale (hence superscript T), but is in units degrees per unit time. For a conventional boiler, it's the initial rate the water temperature increases at when the boiler is on full power. We cannot deduce the boiler's actual power E, only its effect on the heating system, via heat capacity $C_H$.

These are all exponential timescales.

Hence we can write $$\underline{A}_d = \begin{pmatrix} -r_1 - r_2 - r_3 & r_1 & r_3 \\ r_4 & -r_4 & 0 \\ r_5 & 0 & -r_5 \end{pmatrix}; \quad B_d = \begin{pmatrix} 0 \\ r_6^T \\ 0 \end{pmatrix} \frac{1}{E^{max}}; \quad E_d = \begin{pmatrix} r_2 \\ 0 \\ 0 \end{pmatrix}$$

where $\{r_1, r_2, r_3, r_4, r_5\}$ are all positive rates and $r_6$ a positive heating rate. Note that in this notation we can just multiply $r_6^T$ by [0 . . . 1] for the BE term according to the modulation level of the boiler.

Note that our method is not specific to these parameters—we can include an arbitrary number of blocks in our thermal model of the house—this is just a relatively simple example. The method would also work just as well excluding the radiator or thermal mass components of the model, although of course the match to reality would be less good.

The six thermal parameters are determined from previously recorded data of the house's temperature and heat request inputs. There are a variety of methods of achieving this inference. Here we describe a simple and reasonably effective method for estimating these parameters. $r_1$ and $r_2$ are the only ones it is important to get right; estimates suffice for the others.

1. Determine $r_2$: identify a period of time (e.g. overnight) when there has been no heat input for several hours and it is at least 5 degrees cooler outside. The radiators will be at the same temperature as the room and we assume that the thermal mass is the same temperature also. Therefore $$\frac{dT_R}{dt} = r_1(T_H - T_R) - r_2(T_R - T_E) + r_3(T_M - T_R) \simeq -r_2(T_R - T_E)$$

and so $r_2$ is approximately the current room temperature negative gradient divided by the temperature difference to outside.

2. Determine $r_1$: identify a period of continuous heating when the heat has been on for at least 30 minutes. At this point the radiators will have reached their maximum temperature and we assume that the thermal mass is the same temperature as the room. Therefore (from above)

$$\frac{dT_R}{dt} = r_1(T_H - T_R) - r_2(T_R - T_E)$$

from which $r_1$ can be determined from the temperature gradient if we assume a maximum radiator temperature (e.g. $T_H = 65°$).

3. Estimate $r_4$ by looking at overshoot: after the heating has been on for an extended period, look at how long it takes for the room temperature to start falling again. $r_4$ is approximately the inverse of this timescale.

4. Estimate $r_6$ by looking at how long it takes before the room temperature is increasing at its maximum rate at the start of an extended heating period. This time, $t_{inc}$, is approximately the time for the boiler to reach its maximum temperature, and so $r_6 = (T_H - T_R)/t_{inc} \cong 45/t_{inc}$ (in e.g. degrees per hour).

5. Estimate $r_3$ and $r_5$ according to the thermal mass of the property. These do not matter greatly and values in the range 1/(8-24 hours) are usually right.

An example set of sensible parameters (in units of per hour, or degrees per hour for $r_6$) are these (learned from the author's house):

$$r = \{r_1, r_2, r_3, r_4, r_5, r_6\} = \{0.05\ 0.06\ 0.28\ 2.14\ 0.16\ 178\}$$

Calculation Process (Conventional Boiler)

Using a house model with parameters (for time measured in hours, and temperature in degrees C.)

$$r = (0.034\ 0.032\ 0.04\ 3\ 0.09\ 150)^T$$

we can construct matrices $$A_d = \begin{pmatrix} -0.106 & 0.034 & 0.04 \\ 3 & -3 & 0 \\ 0.09 & 0 & -0.09 \end{pmatrix} B_d = \begin{pmatrix} 0 \\ 150 \\ 0 \end{pmatrix} F_d = \begin{pmatrix} 0.032 \\ 0 \\ 0 \end{pmatrix}$$

Integrating these for a timestep of 15 minutes yields $$A = \begin{pmatrix} 0.97643 & 0.0058981 & 0.0097671 \\ 0.52042 & 0.47431 & 0.0029156 \\ 0.021976 & 7.4348e\text{-}05 & 0.97786 \end{pmatrix}$$

$$B = \begin{pmatrix} 0.1249 \\ 26.4093 \\ 0.00098873 \end{pmatrix} F = \begin{pmatrix} 0.0079022 \\ 0.0023511 \\ 8.8586e\text{-}05 \end{pmatrix}$$

We can now construct propagation matrices. Considering 24 hours ahead at 15 minute steps, gives 96×96 matrices. Demonstrating this for room temperature, we construct $T_{offset}^R$ (96×1) and $\mathbf{B}^R$ (96×96) such that $T^R = T_{offset}^R + \mathbf{B}^R E$—a linear equation for predicting room temperature from any set of energy inputs.

For initial temperatures $$\begin{pmatrix} 19 \\ 19 \\ 19 \end{pmatrix}$$

and external temperature forecast $(2.5454\ 2.3907\ 2.2425 \ldots)^T$ these matrices can be calculated from A, B and F:

$$T_{offset}^R = (18.8700\ 18.7415\ 8.6144 \ldots)^T$$

(how temperature is predicted to evolve with no further energy input) and $$B^R = \begin{pmatrix} 0.1249 & 0 & 0 & 0 & \ldots \\ 0.27773 & 0.1249 & 0 & 0 \\ 0.34551 & 02.7773 & 0.1249 & 0 \\ 0.37356 & 0.34551 & 0.27773 & 0.1249 \\ \vdots & & & & \end{pmatrix}$$

(how much energy at each point in time in the future affects temperature at each point in time in the future). The first column shows that energy input at the first time point has a bigger effect on the fourth time point than the first (representing system delays), and the zeros at the top right show that later energy inputs have no effect on earlier temperatures (as would be expected from causality).

The annexed spreadsheet (Annex) shows further information in detail:

Set point of 15 changing to 19, 5, 19 and back to 15
Energy cost $Q_E$ of 10 (constant)
Temperature cost $Q_T$ of 0.5 (constant)
If the temperature cost function $f(\Delta T) = \Delta T + 2(\Delta T)^2$ and we also apply a heating system maximum temperature constraint of 70° C. then the optimised energy input (limited to between 0 and 1) is:

$$E = (0.00004777\ 1\ 0.000049795\ 0.000052045 \ldots)^T$$

with target room temperature (initially identical to the offset because there is no energy input):

$$T^R = (18.8700\ 18.7415\ 18.6114 \ldots)^T$$

The T superscript for the bracketed terms denotes the transpose function, the R superscript for T denotes the fact that it is a T matrix of room temperature.

Examples of further heating, energy input and discomfort profiles are discussed below with reference to FIGS. 3 to 12.

We choose an energy cost of 20 (units per 15 mins at full capacity) and a temperature cost of 1 (units per 15 mins per degree below set point)—this is an "economy" setting with a big energy penalty. We also choose a slightly non-linear (quadratic) cost function to achieve better performance.

Initial Heating Profiles

Figure 3:
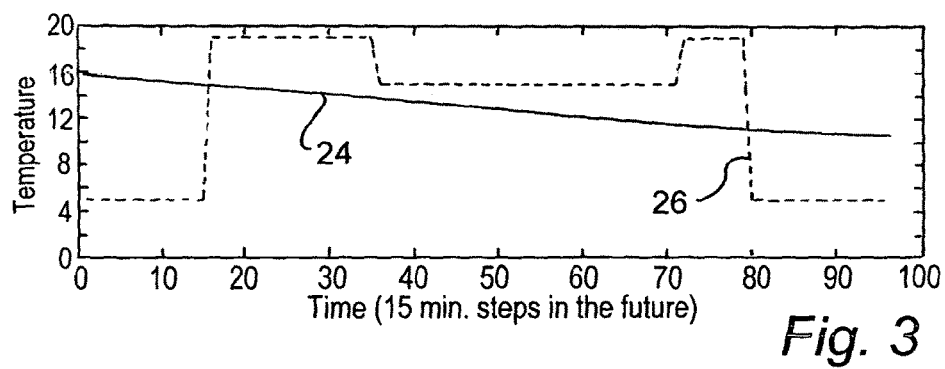
FIG. 3 is a graph showing the predicted temperature of the house over a period of time and a schedule of set point temperatures in the situation in which no energy is delivered to the boiler i.e. there is no heating in the house.

We can now plot graphs of heating profiles and their costs. FIG. 3 shows a solution of zero energy input, the solid line 24 room temperature ($T^R = T_{offset}^R$) (dashed) and the trace 26 the set point profile (red dashed) being used for this optimisation calculation.

The temperature is just allowed to decay as no heat is provided to the (simulated) property.

Figure 4:
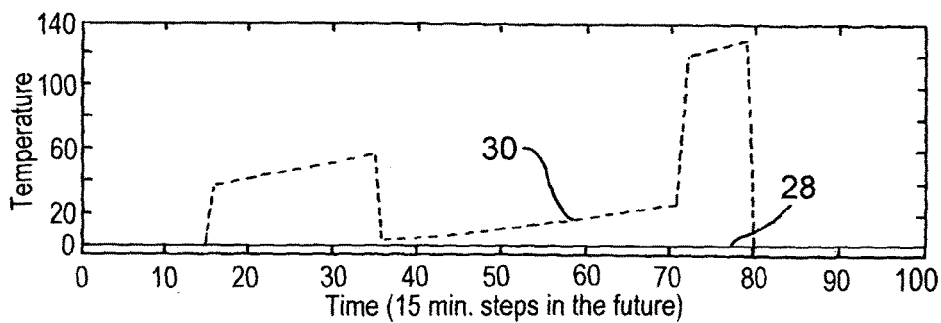
FIG. 4 is a corresponding graph of the discomfort cost arising in those circumstances.

The FIG. 4 shows the energy cost (solid line 28) and discomfort cost (dashed line 30) of this proposed solution as a function of time.

These incorporate both the multipliers Q and the cost functions of energy and temperature difference.

The Total Cost is the sum of both of these over all time, which in this case is 2465.7 arbitrary units. Clearly this is not the optimal solution as all the cost is being incurred only for discomfort—we can inject energy to reduce this.

Optimised Solution

The optimisation process is a way of adjusting the energy input to reduce the total cost. There are published methods for this (linear programming, gradient descent, interior point method, primal-dual methods), given a cost functional (which can be differentiated twice, for a gradient vector and a Hessian matrix) and matrices expressing inequality constraints (and optionally equality constraints). Hence we do not describe these steps in detail as the intricacies are not novel.

Figure 5:
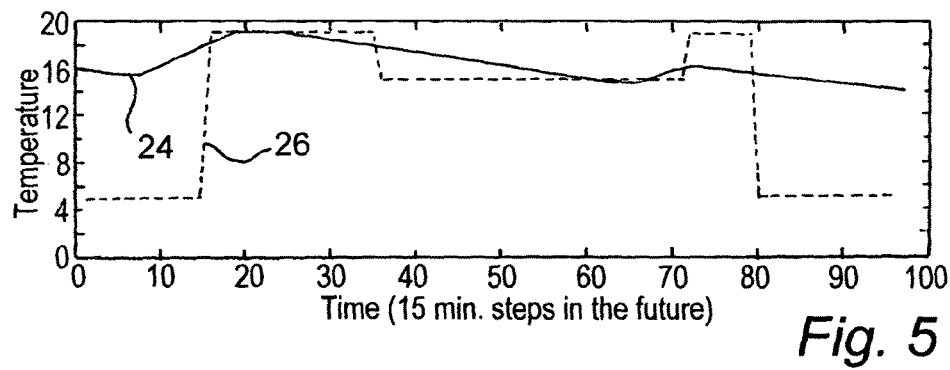
FIG. 5 is an example of the predicted temperature in a situation in which the controller has calculated the energy to be supplied to the boiler so as to minimise the sum of the energy cost and the discomfort cost.
Figure 6:
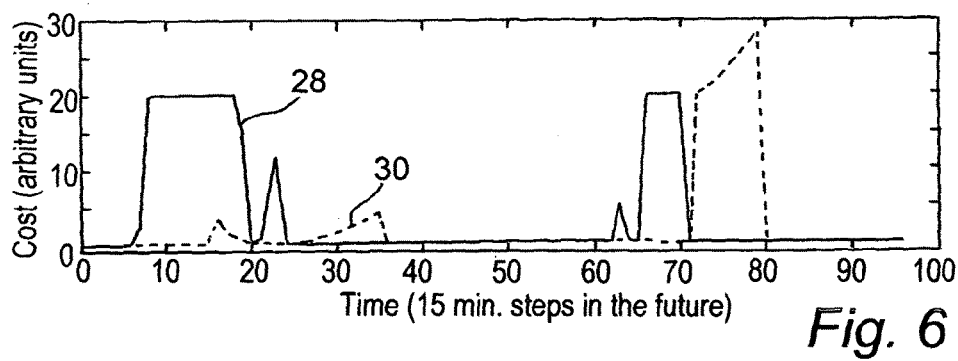
FIG. 6 is a corresponding diagram showing the energy costs and the discomfort costs.

FIGS. 5 and 6 show the optimised solution after solving for the minimum cost, the graphs use the reference numerals of FIGS. 3 and 4 to denote corresponding lines.

Note that the energy cost directly indicates the energy input on a scale of 0 to 20.

The cost as shown in FIG. 6 can be seen to be fairly evenly distributed between Energy Cost 28 and Discomfort Cost now. The Total Cost is 575.5 arbitrary units, significantly reduced from the initial zero energy profile of the previous strategy. The energy usage is 4.52 hours of boiler firing energy.

The boiler fires in advance of the first (evening) period of high set point (at 15 to 35 timesteps), getting the room to temperature in advance, but compromises slightly so that the room isn't quite to temperature at the start. It also doesn't fire for the second half of the period, letting the temperature ride to about 1 degree below set point—energy late at night is effectively expensive, as the heat is "wasted" when not needed overnight. For the following morning period, energy is saved by compromising on a lower temperature (there is little benefit from this energy as the period is so short), and the boiler firing is timed to give maximum benefit from this energy—just taking the chill off.

Comparisons with Other Heating Strategies

To further see the benefits of the controller of the invention, we can compare the heating profile of FIG. 5 with two alternative strategies for heating the home.

Figure 7:
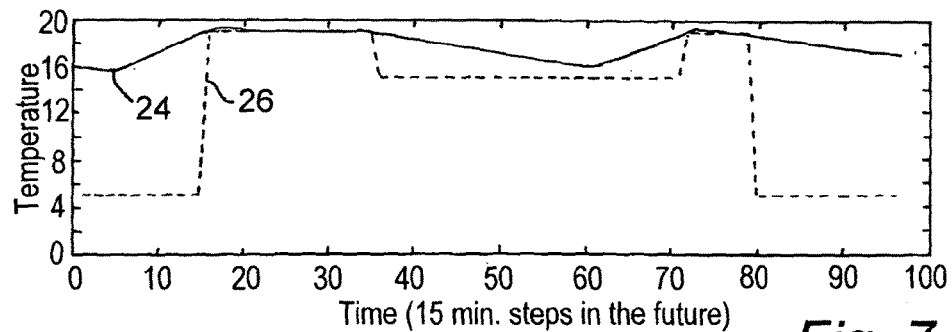
FIG. 7 shows, for the sake of comparison, a graph of predicted temperature if the discomfort cost were to be kept to the minimum.

Firstly, a "comfort" setting where no compromise is allowed. We can calculate this in the same way as above, but with a very low Energy Cost multiplier. This results in a profile as shown in FIG. 7 (which uses corresponding reference numerals to those of FIG. 5).

This uses 7.18 hours of boiler firing energy—nearly 60% more for (subjectively) disproportionately little benefit to the consumer—although this is a demonstration rather than an energy savings claim. The graph is representative of a system which is programmed to get the house to temperature in advance of a high set point period. Note that the method employed by the controller provides an automatic way (i.e. with no separate calculation required) of determining the optimum start time required to get a house to temperature in advance of a high set-point period.

Figure 8:
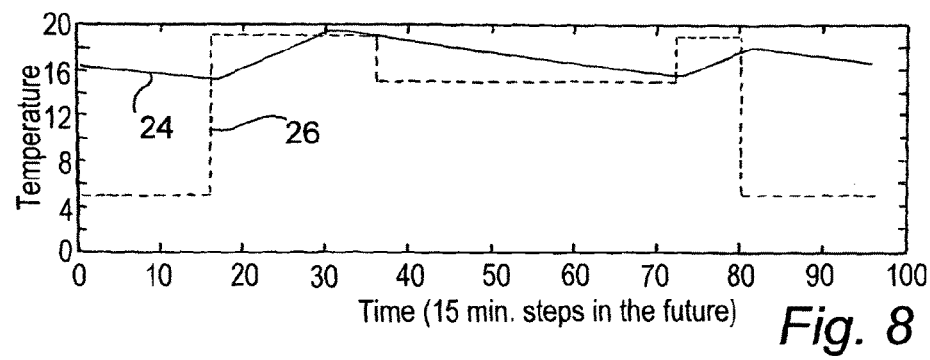
FIG. 8 shows the predicted temperature for the situation in which the control of a boiler corresponds to that provided by a conventional thermostat, programmed to turn the boiler on when room temperature is below the set point temperature (together with some hysteresis)

FIG. 8 shows, for comparison, the theoretical performance of a conventional thermostat, programmed to turn the boiler on when the room temperature is below set point, together with some hysteresis. In this case the solid line 24 is the room temperature predicted for this type of control, the broken line 26 being the set point schedule.

This uses 5.57 hours of boiler firing energy (more than our economised control), but very little of the benefit is seen by the consumer—most of the warmth occurs after they have gone to bed (timestep 40) or when they don't need it (at the end of the time period when the set point is quite low). The Discomfort Cost is high also, as the room is mostly below set point during the higher set point periods.

Heat Pump Control

Figure 9:
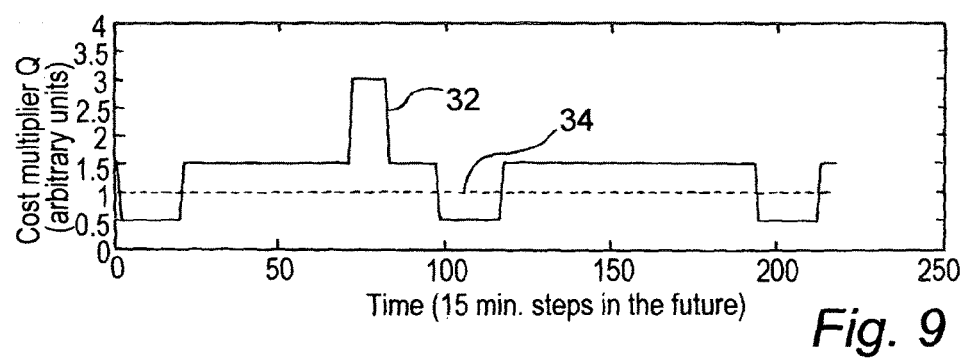
FIG. 9 is a graph showing energy and discomfort cost multipliers in a situation in which a heat pump is used to heat a house using electricity supplied under a tariff which varies over the control period.

An example of optimised heat pump control is shown in FIG. 9, we consider a variable electricity tariff—including a high price for weekday evenings (when demand on the grid is high) and a low price overnight. This is representative of a future grid demand-management scenario. We consider a two-day look ahead period. The cost multipliers $Q_E$ (solid) and $Q_T$ (dashed) are denoted by reference numerals 32 and 34 respectively.

Figure 10:
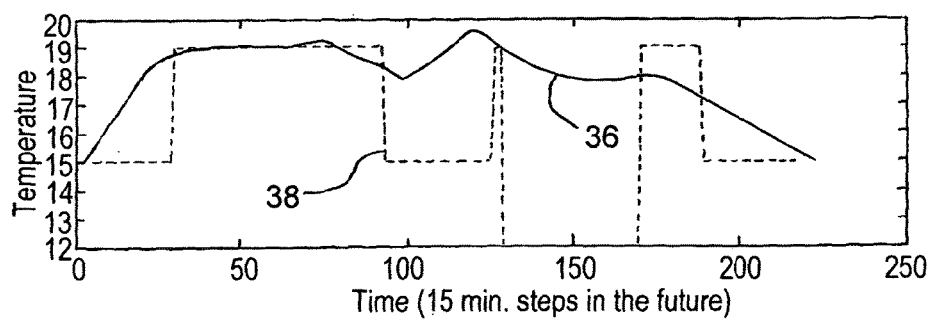
FIG. 10 is a graph showing the temperature profile (and set point schedule) for a house heated by an air source heat pump, the control of which has been optimised by the controller according to the invention.

The solution of the optimisation problem for an air-source heat pump (for a house with specific thermal parameters) is shown on the graph of FIG. 10, with room temperature (solid line 36) and the input set point profile (dashed line 38).

Figure 11:
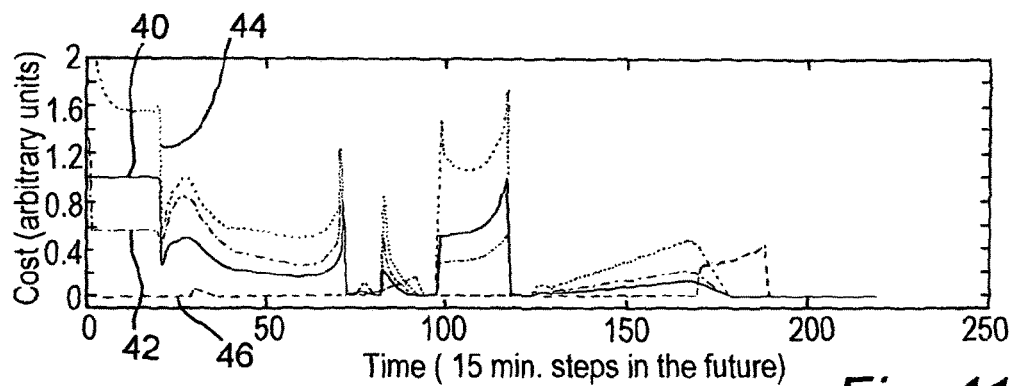
FIG. 11 is a graph showing a number of costs and energy quantities arising from the solution illustrated in FIG. 10.

FIG. 11 shows a number of energy and cost quantities for this solution: the input (electrical) power to the heat pump (solid line 40), the cost of this energy, i.e. multiplied by the tariff information $Q_E$ (dot-dashed line 42), the thermal power provided by the heat pump (dotted line 44), and the Discomfort Cost of this solution (dashed line 46).

Figure 12:
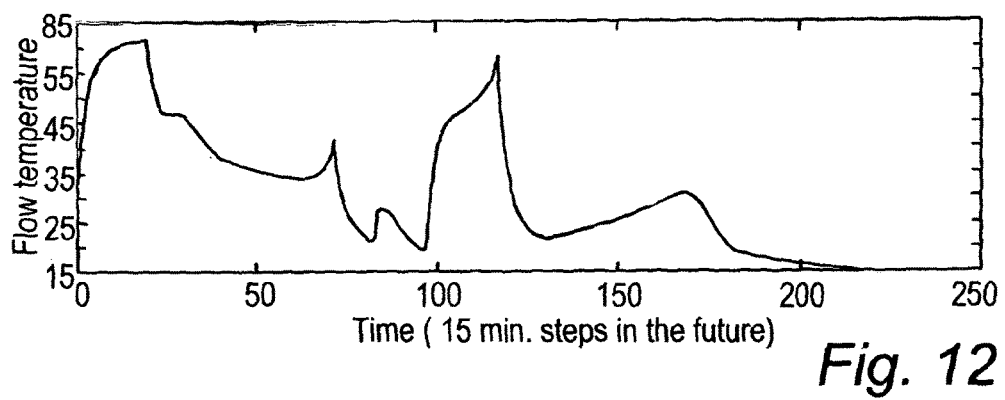
FIG. 12 shows the anticipated flow temperature (radiator temperature) produced by the heat pump controlled in accordance with the solution, the other effects of which are illustrated in FIGS. 10 and 11.

FIG. 12 shows the anticipated flow temperature (radiator temperature) produced by the heat pump. Higher temperatures indicate less efficient running of the heat pump. This can be used to directly control the heat pump, if its interface enables specification of flow temperature.

At the start, the heat pump has to work hard (and relatively inefficiently with a high flow temperature) to bring the room temperature up to the first high set point. During the next period, a minimum flow temperature (~40 degrees) is maintained statically (as in conventional heat pump control, but customised automatically to the house's thermal properties), until the high-demand period approaches. The control then ramps the heap pump power up, to generate enough heat to largely ride out the high-demand period with little further power required. Overnight (the next lower set point period, starting at 100 time steps), the heat pump runs quite hard to take advantage of cheap electricity. Finally, during the unoccupied period (around 150 timesteps) the heat pump gradually ramps its power up—this is a novel heat pump control strategy, as conventionally heat pumps are either run continuously overnight, or are turned off for a crude set-back. At the end, the temperature is allowed to fall off as no future periods are (yet) in sight.

All of the above decisions are determined automatically from the optimisation process, for the whole period at once; at best, conventional heuristic algorithms would have to make each decision individually.

Short Term Control

To illustrate short term control, FIGS. 13-16 graphically show the predictions that are made using the model to decide when is best to fire the boiler.

Figure 13:
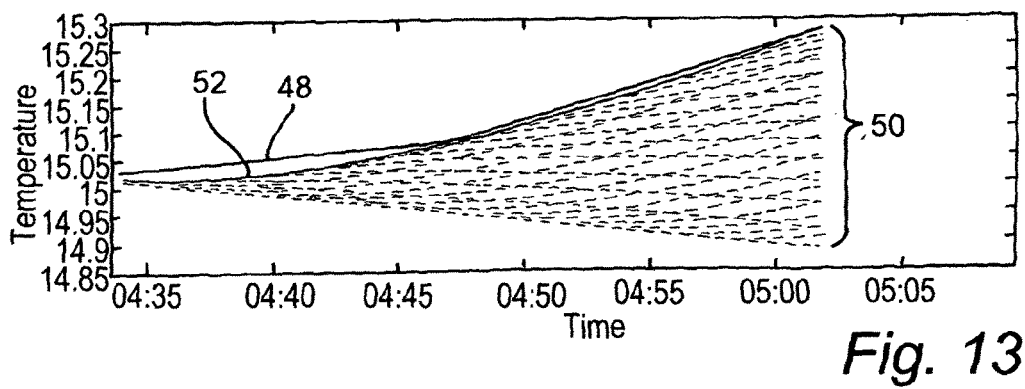
FIGS. 13-15 show how the controller can be used to provide short term control of the boiler in the house.

Firstly, FIG. 13 shows a decision to fire the boiler at the start of an "optimum start" period. The thick line 48 shows the target temperature profile produced by the optimisation calculations for the next half hour. The dashed lines 50 each show the predicted room temperature for a respective set of different control possibilities (firing now, firing later, together with turning off again at later times). The solid line 52 shows the closest fit to the temperature profile, and so this one is chosen. Since this prediction involved the boiler firing immediately, the boiler is turned on at this point.

Figure 14:
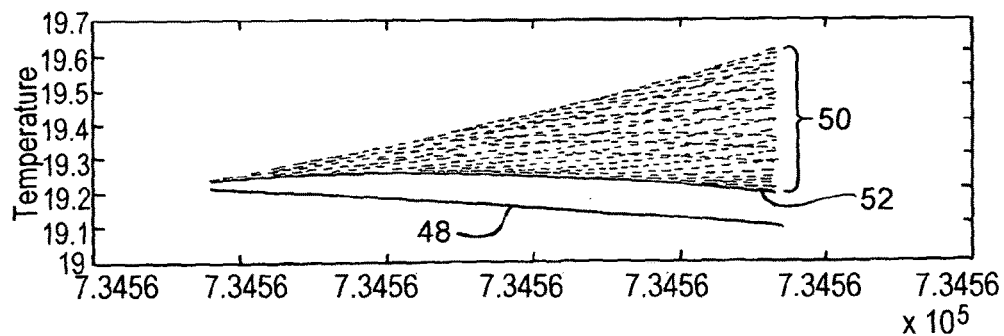

FIG. 14 shows the opposite situation (using the same reference numerals for the corresponding lines): temperature is above the target temperature, and the chosen solution is to turn the boiler off immediately.

Figure 15:
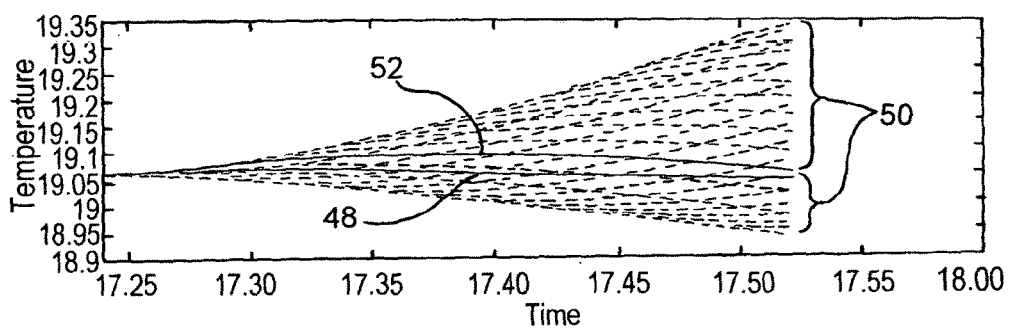

FIG. 15 shows an intermediate situation again using the same reference numerals as FIG. 13: the temperature profile is best matched by leaving the boiler on for a further 6 minutes, and then turning it off, and so no change is made to the boiler state at the present time.

Figure 16:
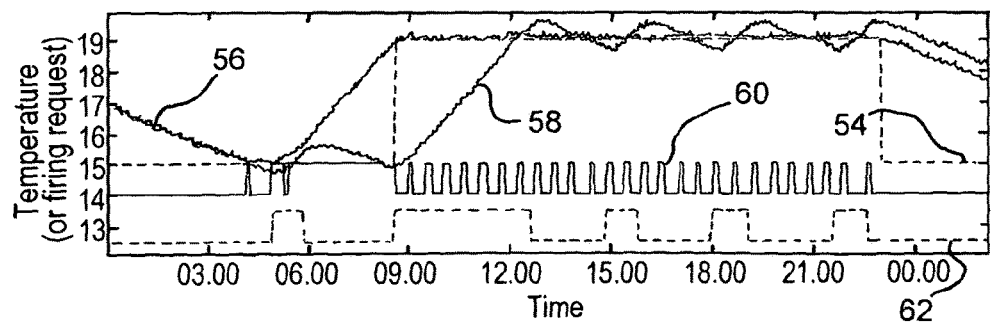
FIG. 16 compares the control achieved by the controller, using the short term control, with the conventional thermostatic control (with hysteresis) for a boiler for a simulated house.

FIG. 16 compares optimisation plus short term control with conventional thermostat control with hysteresis for a simulated house. The set point is shown by dashed line 54, the room temperature achieved with the algorithm employed by the controller is shown by line 56, the room temperature achieved by conventional control is shown by line 58, the boiler firing requests from the control are shown by line 60 and the boiler firing requests from the conventional control are shown in dashed lower line 62.

It can be seen that far tighter control of the smoothing band is achieved with our algorithm, in this case achieving sub-noise level smoothing (which would be impossible with any hysteresis approach). The benefit of this is that the house is always at the required temperature: there is better consumer comfort and no energy is wasted getting the room unnecessarily warm. Whereas the final fire of the conventional control is largely "wasted", the algorithm used by the controller does not heat the room any more than necessary at the end of the high set point period.

The boiler cycles far more often, but at twice an hour this is still within the specification of normal boilers (typically four cycles per hour maximum) and will not impact appreciably on the boiler lifespan. The cycling is far less frequent than "chrono-proportional" control, which cycles the boiler six times per hour all the time (and achieves poorer temperature control).

In summary, through the explicit house model, the algorithm knows exactly the best times to inject heat into the radiators (subject to some cycling time constraints) to achieve a target room temperature.

This invention thus uses a model-based approach to predict an optimal "heating profile" according to the expected occupancy (expressed as a discomfort cost multiplier) of the house over the next day or longer: the best times to provide heat to the house given the occupiers' requirements. The strategy maintains the benefits of undershoot/ overshoot correction, and eliminates the need to make detailed individual decisions about the heating strategy.

The invention quantifies the trade-off between comfort and energy consumption, and uses a mathematical optimisation technique to calculate the heating profile (e.g. energy input at each minute of the day) that will minimise the net "Cost" of combined energy usage and occupier discomfort. In the described examples of quantifiable discomfort is the amount of time that the temperature is below a desired set point (Cost measured in degree-hours), but the technique is not restricted to this measure. Other factors such as the impact of cycling on the lifetime of the heating system can be factored into this Cost.

Three applications of this optimisation approach may be particularly beneficial:
1) Underfloor heating. Controlling an underfloor heating system can be difficult; there is a large thermal inertia from the storage of heat in the physical fabric of the building, and hence energy input needs to be planned many hours in advance. This invention means that the thermal mass of the floor can be explicitly taken into account, and the minimal amount of energy can be injected at the right time to achieve occupant comfort.
2) Heat pumps. Ground-source and air-source heat pumps are one of the most carbon-efficient means of heating a house, but many installations are not as effective as they could be due to poor controls and configuration. The efficiency of a heat pump depends strongly on the temperature of the water it is delivering, so there is a big incentive to run the heat pump as cool as possible. A heat pump is conventionally controlled by running it all the time to achieve a target water temperature, with a simple linear compensation for external temperature. This approach is inflexible (and thus energy-inefficient) and susceptible to misconfiguration. The approach described in this invention avoids these pitfalls by using a model-based predictive control strategy.
3) Smart grids. It is becoming increasingly important to adjust electric grid load according to demand. This invention provides an energy-efficient strategy to support the smart grid with minimal impact on a householder. Advanced knowledge of a period of high grid demand and thus high energy cost can be incorporated in the optimisation calculation for an electric heating system (e.g. a heat pump or storage heater), and the energy profile will be adjusted to achieve comfort at minimal cost, for example increasing heat output before turning the heating system off during a period of high demand.

The invention provides a methodology for calculating the best strategy for putting heat into a home (or other building), so that minimal energy is consumed for achieving occupant comfort.

To utilise Optimised Heating in practice, three stages are involved:
1) Learning the thermal parameters of the house: over a period of several weeks these characteristics can be deduced from sensor measurements. The exact method for this process is not included in the present invention. The controller can work effectively with preset parameters given knowledge of the house type, construction etc.
2) Optimisation of the heating strategy for a period of time in the future (for example looking a day or two ahead).
3) Short-term control to use the heating strategy to control a real heating system: decisions in real time as to when to fire a boiler or what power level to run a heat pump at.

The learning calculations will be run continuously; the optimisation calculations are run periodically (e.g. every 15 minutes, looking ahead for the next day); and the short-term control is run continuously on controller 10, (e.g. every 2 minutes).

To run the optimisation calculations, the following inputs are used:
Model for the house's thermal properties and heating system (e.g. boiler, heat pump), possibly learned. The model is described in more detail in the next section.
Set point schedule for occupant's desired temperature over the optimisation.
External temperature forecast for the optimisation period (received over the internet by the "hub", or an estimate based on the time of year, etc.).
Effective "cost" of energy supplied to the heating system, including any variations in tariff over the optimisation period.
Effective "cost" of occupant discomfort, such as a figure in degree-hours for the room temperature being below (or above) each set point in the schedule period. This could consist of three different temperatures for scheduled "in", "out" and "asleep" periods; more complex variations in temperature can be handled easily.

The output of the optimisation calculations is a "heating strategy" consisting of how much power should be input to the heating system at each point in the optimisation period.

The balance between the two "effective cost" figures determines whether the heating strategy is "economy" (for example, the homeowner is willing to have the temperature below set point for some of the day in order to save energy) or "comfort" (for example, the homeowner is willing to expend energy in order to ensure the house is always at their desired temperatures).

With regard to the model shown in FIG. 2, additional blocks could be included, for example input from a solar thermal panel, or multiple rooms or zones within the house, or even domestic hot water requirements. This means the model can easily be extended to a wide range of system configurations using the same methodology. Non-linear blocks can also be included by linearising them within the optimisation loop (see below); for example a radiator does not strictly transfer heat directly proportional to temperature difference, but this can be represented as a local linear dependence near an approximate temperature. Storage heaters could be included by adding separate control variables for charging and discharging them, with their capacity modelled by a term similar to the heating system thermal mass.

When the heat source is non-linear (as in the case of a heat pump) the optimisation is formed with the thermal energy output from the heat source as the variable parameter, which has a variable cost assigned to it dependent on the system state in the minimisation loop.

The parameters of the thermal model of the house are typically unknown, and need to be learned from measurements made of the house's response to heat input (the techniques for carrying out this learning will be the subject of a future patent application). Nevertheless, even without learning, values can be estimated given the power of the heating system, the number of radiators, the size and build of the house.

In the described examples, the prediction model is used to construct an expression for the Total Cost of a given heating strategy. Total Cost typically consists of (a) Energy Cost plus (b) Discomfort Cost (although the approach is not restricted to this type of Cost). Each of these is multiplied by a Cost coefficient—the balance between these determines whether we are in "comfort" or "economy" mode, as discussed in the Description section.

Energy Cost is (for example) the total energy input over the period. The effective cost of energy can be a financial cost and reflect the energy tariff—and thus can vary throughout the optimisation period, thus supporting smart grids or fixed tariff hours.

Discomfort Cost is (for example) incurred when the temperature is below (or above) the given set points, measured as the integrated temperature difference to the set point. The function can be nonlinear in temperature—for example, to reflect that 2 degrees below set point is more than twice as bad as 1 degree below. Note that the time points where Discomfort Cost is incurred are on the "output" side of the matrix, so the Cost consequences of an energy input are incurred at all subsequent timesteps.

For a non-linear heat source such as a heat pump, the Total Cost is a function of the input power, but the effect on the heating system is a different quantity. We rewrite the Energy Cost term as a function of the output heat (so for a heat pump the Energy Cost is the output heat divided by coefficient of performance). When we differentiate the Cost functional (with respect to input power) we include terms that result from the fact that changing temperatures within the system affect the Total Cost indirectly—the output heat is a function of the input power.

This approach is applicable to air source heat pumps, ground source heat pumps, air to-air heat pumps (and air conditioners), or any other non-linear heat source.

For a heat source such as an air-source heat pump which is dependent on external weather (e.g. air temperature), the approach enables optimised use given weather forecast (e.g. running the heat pump more during the day when it is warmer and thus more efficient).

Some modern heat pumps utilise different thermodynamics (e.g. $CO_2$ refrigerant) and thus perform differently from normal heat pumps; a thermodynamic model for this can be included straight-forwardly in this methodology, with improved optimisation for these heat pumps.

The iteration loop processes impose constraints on the system variables (including but not restricted to):

A maximum power for the heating system (for a non-linear heat source such as a heat pump this affects the input power not the output power)

A maximum water temperature (perhaps 70° for a conventional boiler, or 60° for a heat pump)

Constraints on dependent variables (e.g. temperatures) can be applied with additional terms in the Cost functional.

If the heating system has large changes during a timestep, the iteration process can become unstable for non-linear systems. The solution is to use the average water temperature (or problematic variable) in the update loop, i.e. the average of the previous and next water temperatures, which ensures the Cost implications of a change are directly reflected.

Step changes in variables (costs or constraints) can also cause instability in the optimisation process. This can be helped by using a smooth mathematical function that tends to the desired shape (e.g. piecewise linear) as another parameter goes to zero through the iterations, and with the use of "barrier functions" to represent constraints (with a weighting that goes to zero). We have found that the method that works well in practice is a primal-dual interior point method with logarithmic barrier functions; this can reliably inequality constraints, equality constraints, and non-linearity.

This approach with prediction model matrices and a Cost functional can also be used for other requirements:

Calculating the heating strategy for a fixed energy consumption in the optimisation period—i.e. how to distribute the available energy through the period in order to maximise comfort. This enables a home-owner to specify their spending on heating instead of using a thermostat directly. In this scenario the set point becomes the cut-off where there is no advantage to the homeowner in the temperature being higher (lower) than it.

Calculating the heating strategy that minimises energy for a fixed level of comfort, if this is the user requirement rather than the Total Cost of both together.

Both of these require the specification of equality constraints within the optimisation problem.

The Optimisation calculations are run frequently enough that many changes can be reacted to as part of that, and Short-Term Control can be regarded as finding the best method of distributing the power throughout the optimisation time-step given the physical limitations of the heating system.

One specific approach for Short-Term Control is for an on-off controller as follows:

1. Specify a minimum complete cycle time (e.g. 30 minutes) and a minimum change time (e.g. 5 minutes). If these times are not exceeded, do not change the boiler state.
2. If the boiler is currently off and the heating profile (optimisation output) indicates no heat is required immediately, keep the boiler off.
3. If the boiler is currently on and the heating profile indicates full boiler power is required, keep the boiler on.
4. Otherwise, look ahead a period of time (e.g. 30 minutes) and consider the following possibilities (within the constraints in 1.):
   (a) not changing the boiler state at all
   (b) changing the boiler state at a number of time delays after the present time
   (c) changing the boiler state immediately, and changing it back after a number of time delays after the present time.

For each of these the future temperature is predicted, and compared with the heating profile. The option with a closest (e.g. least squares) match is chosen, and the boiler state changed if this option involves an immediate change to the boiler state.

This approach applies the system wear Cost through fixed cycling time constraints—i.e. Infinite cost for exceeding these constraints. The approach can be extended by dynamically adjusting of the minimum times according to house thermal parameters and state, effectively taking account of a system wear Cost.

A more sophisticated approach takes account of both types of cost directly (i.e. Cost of cycling and accuracy of meeting heating profile), and calculates the configuration of control outputs that minimise the resulting total cost.

One specific example is as follows: Predicting 30 minutes ahead, compare the Cost of not changing the output state (i.e. on to off or vice versa) and changing the output state (once overall) at each 2 minute timestep in the 30 minute period. The Cost is the sum of the cost of a state change and the integrated cost of temperature inaccuracy during the period. If the option with the least Cost is to change the output state now, implement this.

The Short-Term Control method is dependent on the physical system and being controlled and the interface available to it. Such systems include (but are not restricted to):

Conventional boiler control (on or off; self modulating)
Direct control of modulation level of boiler (e.g. through OpenTherm interface)
Heat pump: direct on/off control of unmodulating compressor
Heat pump: direct control of power level of modulating compressor
Heat pump: control of return water temperature (self-modulating)
Heat pumps: overall on/off control (when internal control strategy of heat pump known)

Short-Term Control is not necessarily required; in some cases the output from the Optimisation step can be used directly as an output (e.g. control of return water temperature in heat pump).

SUMMARY

1. A method of calculating a balanced strategy for heating a house or other building by predictively minimising an effective Cost (optimisation).

2. The use of a Total Cost in paragraph 1 consisting of the sum of an Energy Cost and a consumer Discomfort Cost, balanced according to consumer preference (e.g. comfort vs economy).

3. A control system that controls the heating of a building in the most efficient way according to the strategy of paragraph 1.

4. The use of a thermal model to predict the response of a house or other building to a heat input within the method of paragraphs 1 and 3.

5. The use of (but not restricted to) a set of coupled discretised linearised differential equations in a state-space formulation to represent the thermal model in paragraph 4.

6. A means of tailoring the method in paragraph 4 by learning the thermal parameters of a particular building from sensor measurements, or presetting them according to knowledge of the building's construction and heating system etc.

7. The inclusion of multiple thermal blocks in the model of paragraph 4, including but not restricted to: effective room temperature (and multiple rooms, which may have different heating systems), "disconnected" thermal mass, heating system (radiators, underfloor heating, etc), hot water storage, thermal buffers, solar thermal panels, and/or storage heaters (with controllable charge and/or discharge).

8. A Discomfort Cost model in paragraph 2 based on integrated temperature difference relative to scheduled set points (measured in degree-hours for example below set point, or above set points for cooling or night-time cool), or a non-linear function to penalise greater temperature differences more.

9. The inclusion of tariff information to adjust the Energy Cost in the cost model of paragraph 2 to become a financial cost, including fixed hours of lower or higher cost, and dynamically-updated tariff in the future as a function of time from a smart grid.

10. The formulation of the optimisation problem of paragraph 1 through the use of a matrix that represents the effect of energy input at one point in time on the system state (temperatures) at later points in time.

11. The inclusion of forecast weather information (and in particular temperature) in the optimisation calculation, including but not restricted to: a forecast feed from the internet, or a programmed seasonal profile.

12. The solution of the optimisation problem of paragraphs 10 and 11, either directly (e.g. via linear programming) or iteratively (e.g. via gradient descent, multidimensional Newton's method) or otherwise, to produce target energy input and temperature profiles for the heating system, and the imposition of system constraints (such as available heating power and maximum system temperatures) as part of this process.

13. The process of running the optimisation in paragraph 12 periodically (e.g. every 15 minutes), each time looking ahead a particular time period (e.g. one day).

14. The adaptation of the above optimisation to scenarios where individual types of cost or other variables are fixed, such as minimising discomfort for fixed energy consumption, or minimising financial cost for a fixed comfort level.

15. The adaptation of the above optimisation to allow for non-linear heating system elements such as radiators, by successfully adjusting the linear approximation to their response at each iteration.

16. The adaptation of the above optimisation for a non-linear heat source such as a heat pump, by using the thermal energy output as the optimisation variable (to keep the model linear) and using a non-linear cost in the optimisation which can be minimised by using its gradient.

17. The strategy of setting back a heat pump (e.g. overnight) by reducing its power and then gradually increasing it during the set back period [this provides efficient set back and re-heating, as an observed output from optimisation calculations].

18. The adaptation of the above optimisation to a condensing boiler (which has direct level control or temperature control) in order to maximise use of the more efficient lower-temperature regime, or any other heating system whose efficiency changes in a known way with operating condition.

19. The use of a smooth function to approximate a piece-wise linear cost (or constraint) in the process of paragraph 12 with a parameter that goes to zero through the iterations.

20. The quantitative or qualitative inclusion of terms in the optimisation process described in paragraphs 12 and 16 that are relevant to the indirect costs of the heating system being non-linear, e.g. for a heat pump the fact that increasing energy input increases water temperatures at later times and thus decreases the efficiency at later times.

21. The process for dealing with instability in the discrete representation of the heating model by using the non-causal average over the current and next time-steps to represent effective temperature and efficiency.

22. The practical application of a heating strategy produced by the above optimisation on a physical system by means of a secondary short-term control optimisation.

23. A short-term control optimisation of paragraph 22 that utilises a thermal model which may be the same as the one described in paragraphs 6 and 7.

24. A short-term control optimisation of paragraph 22 that enables a quantitative trade-off between heating system wear (such as boiler cycling) and other factors such as accuracy of meeting the optimum heating profile.

25. A means of carrying out short-term control optimisation by evaluating the predictive cost of configurations of control outputs and choosing the one with minimal cost, optionally by constraining the cycling times of the heating system.

26. The use of short-term control optimisation to target the optimum heating profile, for example by finding the distribution of the input power that best meets the target temperature profile.

27. The usage of the original set points or energy requirements in the short term control in order to only target the parts of the heating strategy that matter (for example not necessarily trying to exactly follow the predicted temperature decline after a heating period).

28. A short-term control optimisation of paragraph 22 for controlling a system with a continuously variable power level (such as a modulating boiler with an appropriate interface).

29. A short-term control optimisation of paragraph 22 for controlling a system that only has a physical on or off control, which may or may not modulate itself (and the inclusion of prediction of how the system modulates itself).

30. A short-term control optimisation of paragraph 22 for controlling a system with a number of discrete power levels (such as a modulating heat pump).

31. A short-term control optimisation of paragraph 22 for controlling a system by specifying an indirect variable such as temperature (particularly relevant to controlling a heat pump through flow or return water temperature from it); the system then controls itself internally to meet this specification.

32. The use of the above methods to control a heat pump or other heating system by learning or programming its internal configuration (such as temperature compensation curve) and controlling it indirectly according to a higher level control interface (such as on/off control).

33. The execution of all of the above methods on a smart energy management computer running in the building, connected to sensors and controllable outputs.

ANNEX

```
r          (/hour)                              (deg/hour)
   0.034      0.032      0.04        3      0.09       150

Ad         (/hour)                   Bd (deg/hour)     Fd (/hour)
   -0.106    0.034      0.04                  0          0.032
       3       -3          0                150              0
    0.09        0      -0.09                  0              0

A          (unitless)                B (deg)            F (unitless)
 0.976432576  0.005896098  0.009767078   0.124902064     0.0079902248
 0.520420374  0.474312921  0.002915608  26.40925602      0.002351098
 0.021975926  7.4348E-05   0.977861141   0.000388727     8.85859E-05
```

The following quantities are available on 96 timesteps at 15min intervals in the future
External temp forecast (degrees)    (simulated, hence unrealistic precision!)
2.545445959 2.390664613 2.242504222 2.101597873 1.968547586 1.843921644 1.728252361 1.6220336 1.525716763 1.439718831 1.364400601 1.30008512 1.247046315 1.205509815 1.17565199 1.157599198

Calculated T_R,offset
18.86997203 18.74154295 18.6144183 18.48846934 18.3636476 18.23994463 18.11737296 17.99595707 17.8757287 17.75672468 17.6389856 17.5225549 17.40747833 17.29380339 17.18157889 17.07085447

Calculated T_H, offset
18.96131374 18.87492698 18.76675464 18.64893702 18.52716708 18.40412145 18.28106675 18.15861172 18.03705907 17.91657012 17.79724166 17.67914166 17.56232586 17.44684525 17.33274935 17.22008757

Calculated matrix B^R    (first four rows and columns only)
```
0.124902064   0             0             0
0.27773247    0.124902064   0             0
0.345506916   0.27773247    0.124902064   0
0.373564352   0.345506916   0.27773247    0.124902064
```

Received set points
15 15 15 15 15 15 15 15 15 15 15 15 15 15 15 15

Energy cost
10 10 10 10 10 10 10 10 10 10 10 10 10 10 10 10

Temperature cost
0.5 0.5 0.5 0.5 0.5 0.5 0.5 0.5 0.5 0.5 0.5 0.5 0.5 0.5 0.5 0.5 f(delta T) = (delta T) + 2 * (deltaT)^2

Output from optimisation
E    (energy input, on scale of 0 to 1)
0.000047771 0.000049795 0.000052045 0.00005456 0.000057388 0.000060595 0.00006426 0.00006849 0.000073425 0.00007926 0.000086284 0.000094827 0.000105535 0.00011931 0.000137687 0.000163434

Target room temperature profile
18.86997799 18.74156243 18.61445513 18.48852566 18.3637248 18.24004385 18.11749532 17.99610372 17.87590101 17.75692427 17.6392144 17.52281532 17.40777337 17.29413689 17.1819559 17.07126197

Target heating system temperature profile
18.96257533 18.87584353 18.7690483 18.65148498 18.52992052 18.40706789 18.284213 18.16197648 18.04067048 17.92046597 17.80147159 17.68377141 17.56744452 17.45257761 17.33927816 17.22769678

The invention claimed is:

1. A controller for a temperature management system for heating and/or cooling a room in accordance with a schedule of set point temperatures over a control period, the controller comprising a data processor arrangement; a temperature input for receiving a signal indicative of the current temperature in the room; a control output for supplying control signals to the system; and at least one electronic memory for storing said schedule of set point temperatures, a relationship, based on known heating or cooling characteristics of the room, between energy supplied to the system in a portion of the control period and a predicted temperature of the room during that portion and subsequent portions of the control period, a first parameter value representative of the cost of supplying said energy and a second parameter value representative of a predetermined acceptability of variations of an actual or the predicted temperature of the room from the schedule of set point temperatures, wherein the data processor arrangement is operable to calculate, for each said portion, the energy to be supplied to the system in order for a plurality of parameter values to satisfy a predetermined criterion, said plurality of parameter values comprising said first parameter value and said second parameter value, and wherein the second parameter value comprises the product of a comfort cost multiplier and the difference between the set point temperature and the actual or predicted temperature at the time.

2. The controller according to claim 1, in which the controller is preprogrammed so that said relationship is stored in the memory.

3. The controller according to claim 2, in which the controller is arranged to receive said schedule of set point temperatures via a user interface.

4. The controller according to claim 1, in which the criterion is applied to the sum of the parameter values.

5. The controller according to claim 1, in which the criterion is that the sum of the two values is substantially at a minimum.

6. The controller according to claim 5, in which the controller is operable to determine a schedule of energy to be applied to achieve said minimum by an iterative process such as the gradient descent method or the Newton's method.

7. The controller according to claim 6, in which the minimum is determined by the Primal-dual barrier function method.

8. The controller according to claim 5 in which the sum is of the values over the whole control period.

9. The controller according to claim 1, in which the data processor arrangement is operable to update said calculations for each of the portions over the course of the control period, to enable departures of the current temperatures from those previously predicted to be taken into account.

10. The controller according to claim 1, in which the control period is of 24 hours' duration, each portion being of 15 minutes' duration so that the period is constituted by 96 consecutive portions.

11. The controller according to claim 1, in which the first parameter value comprises the product of the energy to be supplied to the system and an energy cost multiplier.

12. The controller according to claim 11, in which the energy cost multiplier is variable to take into account an actual or predicted cost of consuming energy.

13. The controller according to claim 1, in which the comfort cost multiplier varies over the course of a control period.

14. The controller according to claim 1, in which the controller is operable during each said portion, to compare a predicted temperature profile associated with the energy, for each said portion, as calculated by the data processor arrangement, as a target for a boiler and to compare this profile with further calculated temperatures for a part of the control period for different sequences of activation or deactivation of the boiler, an on-off control sequence being selected from a number of possible sequences to provide a profile of said calculated temperatures that most closely matches the temperature profile.

15. The controller according to claim 1, in which said relationship is based on a heat transfer model that takes into account at least one of:
  (a) the heat capacity and thermal transfer properties of the temperature management system;
  (b) the heat capacity and thermal transfer properties of the thermal mass of the room; and
  (c) the thermal transfer properties between the room and the external environment.

16. The controller according to claim 15, in which the properties identified at (c) include the forecasted temperatures of the environment outside the room over the control period.

17. The controller according to claim 1, in which the controller is arranged as to control a temperature management system having a heat pump, solar thermal panels and/or storage heaters.

18. The controller in accordance with claim 1, in which the controller is operable to control the temperature management system for heating and/or cooling a plurality of rooms or areas, the controller having a plurality of temperature inputs, one for each respective room/area.

19. The controller according to claim 1, in which the controller has a plurality of control outputs, each for controlling an energy input to a respective part of the system.

20. A temperature management system for heating and/or cooling a room, the system having a controller in accordance with claim 1.

21. The system according to claim 20, in which the system comprises a heat pump.

22. A method of controlling a temperature management system comprising a controller equipped with a processor coupled with memory-stored instructions programmed for controlling heating and/or cooling of a room in accordance with a schedule of set point temperatures over a control period, the controller comprising an input for receiving data on the current value of cooling/heating characteristics, a control output for supplying control signals to the system and at least one electronic memory for storing said schedule of set point temperatures, a relationship between the control output in a portion of the control period and the predicted value of the characteristics during that portion and subsequent portions of the control period, the method comprising executing the instructions by the processor to perform the steps of:
  (a) determining from known or predicted heating and/or cooling characteristics of a room a relationship between a series of predicted temperatures of the room in each of a succession of portions of the period and the energy supplied to the system in each of those portions; and
  (b) for each portion, using said relationship to calculate the amount of energy to be supplied in order for a first parameter value representative of the cost of supplying that energy and a second parameter value representative of a predetermined tolerance of variations of the predicted temperatures from the schedule of set point temperatures to satisfy a predetermined criterion, wherein the second parameter value comprises the product of a comfort cost multiplier and the difference between the set point temperature and an actual or the predicted temperature at the time.

23. A controller for managing a quantitative characteristic of an apparatus in accordance with a schedule of set point values for the characteristic over a control period, the controller comprising an input for receiving data on the current value of said characteristic, a control output for supplying control signals to the apparatus and at least one electronic memory for storing said schedule of set point values, a relationship between the control output in a portion of the control period and the predicted value of the characteristic during that portion and subsequent portions of the control period, a first parameter value representative of the cost of energy supplied to or consumed by the apparatus in response to said control signals and a second parameter value representative of the acceptability of variations of the actual or predicted value of the characteristics from the schedule of set point values, wherein the controller further comprises a processor arrangement operable to calculate, for each said portion, the energy to be supplied to or consumed by the apparatus in order for a plurality of parameter values to satisfy a predetermined criterion, said plurality of parameter values comprising said first parameter value and said second parameter value, and wherein the second parameter value comprises the product of a comfort cost multiplier and a non-linear function of the difference between the set point temperature for a portion and the actual or predicted temperature in that portion.

24. The controller according to claim 23, in which said function gives a linear relationship between the second parameter and said difference for actual or predicted temperatures below the corresponding set points and a value of zero for actual or predicted temperatures above the corresponding set points.

25. The controller according to claim 24, in which the predetermined criterion is that the sum of the first and second parameter values is at a minimum, wherein the processor arrangement is operable to calculate and save to the electronic memory the sum for calculation of the energy to be supplied to or consumed by the apparatus, wherein the sum, cost Q, is given by:

$$\text{Cost } Q = \Sigma_k (Q_k^E E_k + Q_k^T f(T_{sp,k} - T_R))$$

where the function $f(\Delta T)$ specifies the cost of an individual temperature's variation from set point, and $f(x)=0$ $(x<0)$; $f(x)=x$ $(x>0)$, for each portion k, $T_R$ is the actual or predicted room temperature, $T_{sp,k}$ is the set point temperature input by a user and saved in the electronic memory, $Q_k^E$ is an energy cost multiplier, and $Q_k^T$ is a comfort cost multiplier.

26. The controller according to claim 25, in which the energy cost multiplier is variable to take into account variations in the thermal efficiency of the apparatus.

27. The controller according to claim 26, in which the energy cost multiplier comprises the cost per unit energy supplied to the system divided by the co-efficient of performance of the system.

* * * * *